(12) United States Patent
Galvez et al.

(10) Patent No.: US 12,163,050 B2
(45) Date of Patent: Dec. 10, 2024

(54) INVISIBLE-FINGERPRINT COATINGS AND PROCESS FOR FORMING SAME

(71) Applicant: HENKEL AG & CO. KGAA, Duesseldorf (DE)

(72) Inventors: Miguel Galvez, Danvers, MA (US); Bong June Zhang, Chestnut Hill, MA (US); Esra Altinok, Medford, MA (US); Perry L. Catchings, Sr., Roxbury, MA (US); Michael M. Martinez, Boston, MA (US); Parfait Jean Marie Likibi, Mount Pleasant, SC (US); Fouad Salhi, Farmington, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/804,953

(22) Filed: Feb. 28, 2020

(65) Prior Publication Data

US 2020/0277513 A1  Sep. 3, 2020

Related U.S. Application Data

(60) Provisional application No. 62/812,329, filed on Mar. 1, 2019.

(51) Int. Cl.
| | | |
|---|---|---|
| C09D 183/08 | (2006.01) | |
| C03C 17/30 | (2006.01) | |
| C08G 77/24 | (2006.01) | |
| C09D 5/00 | (2006.01) | |

(52) U.S. Cl.
CPC ............ *C09D 183/08* (2013.01); *C03C 17/30* (2013.01); *C08G 77/24* (2013.01); *C09D 5/00* (2013.01); *C03C 2217/76* (2013.01); *C03C 2218/112* (2013.01)

(58) Field of Classification Search
None
See application file for complete search history.

(56) References Cited

U.S. PATENT DOCUMENTS

| | | | |
|---|---|---|---|
| 5,762,697 A | 6/1998 | Sakamoto et al. | |
| 9,249,338 B2 | 2/2016 | Park et al. | |
| 9,327,315 B2 | 5/2016 | Erisksson et al. | |
| 2005/0020758 A1* | 1/2005 | Terry ................. | C09D 4/00 523/435 |
| 2010/0092686 A1* | 4/2010 | Laryea ............... | C08G 18/3812 427/458 |
| 2012/0037040 A1* | 2/2012 | Standke ............. | C07F 7/1892 106/287.11 |
| 2012/0088090 A1 | 4/2012 | Miyazaki et al. | |
| 2013/0025503 A1 | 1/2013 | Park et al. | |
| 2014/0120340 A1* | 5/2014 | Riddle ............... | C09D 5/00 428/312.6 |
| 2017/0190139 A1* | 7/2017 | Haghdoost ......... | B32B 15/20 |
| 2017/0349785 A1* | 12/2017 | Galvez .............. | C09D 183/04 |

FOREIGN PATENT DOCUMENTS

| | | |
|---|---|---|
| CN | 102898943 A | 1/2013 |
| DE | 102008007261 A1 | 3/2009 |
| EP | 3255108 A1 | 12/2017 |

OTHER PUBLICATIONS

International Preliminary Report on Patentability for International Patent Application No. PCT/US2020/020297; Mar. 24, 2021.
Search Report for International Application No. PCT/US2020/020297; May 7, 2020.
Extended European Search Report; European Patent Application No. 20767295.7; Nov. 24, 2022.
Office Action; Japanese Patent Application No. 2021-551787; Dec. 19, 2023.
Extended European Search Report; European Patent Application No. 24178890.0; Jun. 14, 2024.

* cited by examiner

*Primary Examiner* — Ramsey Zacharia
(74) *Attorney, Agent, or Firm* — Steven C. Bauman

(57) ABSTRACT

A process for forming a coating on a substrate comprises forming a non-fluorinated alkyl silane hydrolysate polymer and applying the non-fluorinated alkyl silane hydrolysate polymer to a surface of the substrate. The formed invisible-fingerprint coating can have an initial oil angle less than 50°.

14 Claims, 7 Drawing Sheets

INVISIBLE-FINGERPRINT COATINGS AND PROCESS FOR FORMING SAME

CROSS-REFERENCE TO RELATED APPLICATIONS

This application claims the benefit of U.S. Provisional Patent Application No. 62/812,329, filed Mar. 1, 2019, the entire disclosure of which is herein incorporated by reference.

FIELD

The present disclosure relates, in exemplary embodiments, to coating compositions for coating a substrate to render fingerprints invisible or nearly invisible.

BACKGROUND

A person naturally produces sebum (from the sebaceous gland) and other oils from the face and fingertips. A person may deposit such oils on cell phone (or other article) display screens, such as glass (or a screen protector, typically a polymeric plastic), glass ceramic, metal oxide, Plexiglas or the like materials or surfaces. Often, such oils are visible and can reduce the quality of the images seen on the device, as well as contribute (with dirt, dust, etc.) to a reduced aesthetic appearance of the screen. Invisible fingerprint ("IFP") coatings are generally oleophilic coatings that cause oils to appear invisible, or nearly invisible, by causing the oils to spread along the screen surface. The deposited oils may match the index of refraction of the screen material, e.g., glass, so that light passes through making it appear that there are no fingerprints. The fingerprints may still be present, one just cannot see them (at least not without scrutinizing the surface).

One of the more significant problems with optically transparent substrates and coatings is mechanical abrasion, which degrades, wears away or diminishes the coating thickness, transparency or effectiveness. Abrasion occurs to a greater or lesser extent during substrate handling by the user, such as by rubbing with a cloth to remove fingerprints and dirt, which is periodically necessary in particular for restoring satisfactory visibility through a transparent substrate. Degradation may also result from exposure to ultraviolet radiation, heat, cold, chemical, salt or other corrosive material, dirt, other abrasive material, or other environmental elements, conditions or materials.

In contrast to IFP, "anti-fingerprint" ("AFP") coatings are oleophobic coatings that resist wetting. Because of the oleophobicity, fingerprints can form and subsequently wiped away. IFP coatings function in a different manner than AFP coatings.

It would be desirable to have a coating that can provide optically transparency, mechanically durability, and invisible fingerprint properties.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

The present disclosure relates, in exemplary embodiments to compositions and formulations for providing IFP coating.

In one aspect, the disclosure relate to an article, comprising:
a substrate; and
an invisible-fingerprint coating deposited on the substrate, the invisible-fingerprint coating comprising a non-fluorinated alkyl silane hydrolysate polymer having a weight average molecular weight of less than 100,000 Da.

In another aspect, the disclosure relates to an article, comprising:
a substrate; and
an invisible-fingerprint coating deposited on the substrate, the invisible-fingerprint coating comprising a non-fluorinated alkyl silane hydrolysate polymer,
wherein the invisible-fingerprint coating has a thickness of less than 1000 nm. In some embodiments, the thickness is greater than 0.1 nm.

In another aspect, the disclosure relates an invisible-fingerprint composition, comprising:
a solvent; and
a non-fluorinated alkyl silane hydrolysate polymer having a weight average molecular weight of less than 100,000 Da.

In another aspect, the disclosure relates to a method for forming an invisible-fingerprint composition, comprising:
polymerizing, in a first solvent comprising water and an organic solvent, an alkyl silane to form a non-fluorinated alkyl silane hydrolysate; and
dissolving the non-fluorinated alkyl silane hydrolysate in a second solvent to a concentration of at least 0.01 mg/L and less than 100 g/L. In some embodiments, the organic solvent is an alcohol.

In another aspect, the disclosure relates to a method for forming an invisible-fingerprint surface, comprising:
depositing, on a surface of a substrate, a formulation comprising:
a solvent; and
a non-fluorinated alkyl silane hydrolysate polymer having a weight average molecular weight of less than 100,000 Da and at least 300 Da; and
curing the formulation to form the invisible-fingerprint surface.

In another aspect, the disclosure relate to an article, composition, or method as described herein wherein the non-fluorinated alkyl silane hydrolysate polymer comprises a functional group selected from the group consisting of hydroxy, carboxy, amino, halo, and combinations thereof.

Other features will become apparent upon reading the following detailed description of certain exemplary embodiments, when taken in conjunction with the appended claims.

BRIEF DESCRIPTION OF THE DRAWINGS

The drawings disclose exemplary embodiments or test results in which.

DETAILED DESCRIPTION

Figure 1:
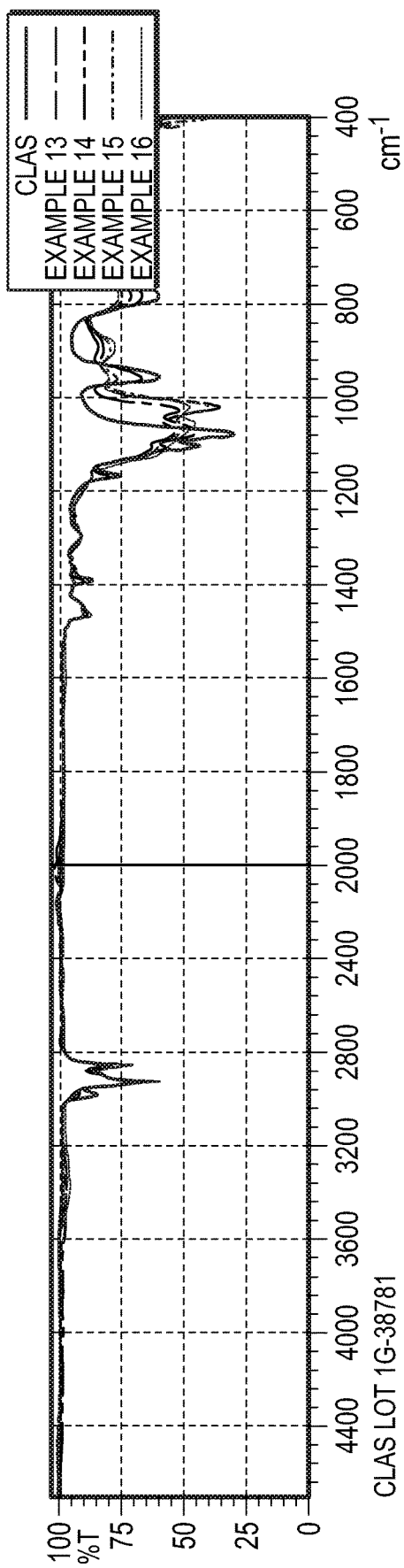
FIG. 1 shows an FTIR of Examples 13-16.

As used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As used herein, the terms "including," "containing," and "comprising" are used in their open, non-limiting sense. Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

To provide a more concise description, some of the quantitative expressions given herein are not qualified with the term "about." It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. Whenever a yield is given as a percentage, such yield refers to a mass of the entity for which the yield is given with respect to the maximum amount of the same entity that could be obtained under the particular stoichiometric conditions. Concentrations that are given as percentages refer to mass ratios, unless indicated differently.

Except as otherwise noted, the methods and techniques of the present embodiments are generally performed according to conventional methods well known in the art and as described in various general and more specific references that are cited and discussed throughout the present specification. See, e.g., Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination. All combinations of the embodiments pertaining to the chemical groups represented by the variables are specifically embraced by the present disclosure and are disclosed herein just as if each and every combination was individually and explicitly disclosed, to the extent that such combinations embrace compounds that are stable compounds (i.e., compounds or polymers that can be isolated, characterized). In addition, all subcombinations of the chemical groups listed in the embodiments describing such variables are also specifically embraced by the present disclosure and are disclosed herein just as if each and every such sub-combination of chemical groups was individually and explicitly disclosed herein.

Definitions

As used herein, the term "alkyl" includes a chain of carbon atoms, which is optionally branched and contains from 1 to 20 carbon atoms. It is to be further understood that in certain embodiments, alkyl may be advantageously of limited length, including $C_1$-$C_{12}$, $C_1$-$C_{10}$, $C_1$-$C_9$, $C_1$-$C_8$, $C_1$-$C_7$, $C_1$-$C_6$, and $C_1$-$C_4$. Illustratively, such particularly limited length alkyl groups, including $C_1$-$C_8$, $C_1$-$C_7$, $C_1$-$C_6$, and $C_1$-$C_4$, and the like may be referred to as "lower alkyl." Illustrative alkyl groups include, but are not limited to, methyl, ethyl, n-propyl, isopropyl, n-butyl, isobutyl, sec-butyl, tert-butyl, pentyl, 2-pentyl, 3-pentyl, neopentyl, hexyl, heptyl, octyl, and the like. Alkyl may be substituted or unsubstituted. Typical substituent groups include cycloalkyl, aryl, heteroalicyclic, alkoxy, halo, carbonyl, oxo, (=O), C-carboxy, O-carboxy, nitro, and amino, or as described in the various embodiments provided herein. It will be understood that "alkyl" may be combined with other groups, such as those provided above, to form a functionalized alkyl. By way of example, the combination of an "alkyl" group, such as a $C_1$-$C_{10}$ alkyl group as described herein, with an "aryl" group may be referred to as an "$C_1$-$C_{10}$ alkylaryl" group.

As used herein, the term "alkenyl" includes a chain of carbon atoms, which is optionally branched, and contains from 2 to 20 carbon atoms, and also includes at least one carbon-carbon double bond (i.e., C=C). It will be understood that in certain embodiments, alkenyl may be advantageously of limited length, including $C_2$-$C_{12}$, $C_2$-$C_9$, $C_2$-$C_8$, $C_2$-$C_7$, $C_2$-$C_6$, and $C_2$-$C_4$. Alkenyl may be unsubstituted or substituted as described for alkyl or as described in the various embodiments provided herein. The at least one carbon-carbon double bond may be internal or terminal. Illustrative alkenyl groups include, but are not limited to, ethenyl, 1-propenyl, 2-propenyl, 1-, 2-, or 3-butenyl, and the like.

As used herein, the term "alkynyl" includes a chain of carbon atoms, which is optionally branched, and contains from 2 to 20 carbon atoms, and also includes at least one carbon-carbon triple bond (i.e., C≡C). It will be understood that in certain embodiments, alkynyl may each be advantageously of limited length, including $C_2$-$C_{12}$, $C_2$-$C_9$, $C_2$-$C_8$, $C_2$-$C_7$, $C_2$-$C_6$, and $C_2$-$C_4$. Alkynyl may be unsubstituted, or substituted as described for alkyl or as described in the various embodiments provided herein. The at least one carbon-carbon triple bond may be internal or terminal. Illustrative alkynyl groups include, but are not limited to, ethynyl, 1-propynyl, 2-propynyl, 1-, 2-, or 3-butynyl, and the like.

As used herein, the term "aryl" refers to an all-carbon monocyclic or fused-ring polycyclic groups of 6 to 12 carbon atoms having a completely conjugated pi-electron system. It will be understood that in certain embodiments, aryl may be advantageously of limited size such as $C_6$-$C_{10}$ aryl. Illustrative aryl groups include, but are not limited to, phenyl, naphthylenyl and anthracenyl. The aryl group may be unsubstituted or substituted as described for alkyl or as described in the various embodiments provided herein.

As used herein, the term "cycloalkyl" refers to a 3 to 15 member all-carbon monocyclic ring, including an all-carbon 5-member/6-member or 6-member/6-member fused bicyclic ring, or a multicyclic fused ring (a "fused" ring system means that each ring in the system shares an adjacent pair of carbon atoms with each other ring in the system) group, or a carbocyclic ring that is fused to another group such as a heterocyclic, such as ring 5- or 6-membered cycloalkyl fused to a 5- to 7-membered heterocyclic ring, where one or more of the rings may contain one or more double bonds but the cycloalkyl does not contain a completely conjugated pi-electron system. It will be understood that in certain embodiments, cycloalkyl may be advantageously of limited size such as $C_3$-$C_{13}$, $C_3$-$C_9$, $C_3$-$C_6$ and $C_4$-$C_6$. Cycloalkyl may be unsubstituted or substituted as described for alkyl or as described in the various embodiments provided herein. Illustrative cycloalkyl groups include, but are not limited to, cyclopropyl, cyclobutyl, cyclopentyl, cyclopentenyl, cyclopentadienyl, cyclohexyl, cyclohexenyl, cycloheptyl, and the like. Illustrative examples of cycloalkyl groups shown in graphical representations include the following entities, in the form of properly bonded moieties:

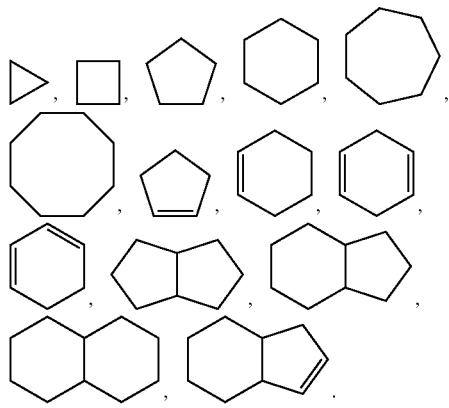

As used herein, "halo" or "halogen" refers to chlorine, bromine, or iodine, except for fluorine.

The term "oxo" represents a carbonyl oxygen. For example, a cyclopentyl substituted with oxo is cyclopentanone.

As used herein, "hydroxy" or "hydroxyl" refers to an —OH group.

As used herein, "alkoxy" refers to both an —O-(alkyl) or an —O-(unsubstituted cycloalkyl) group. Representative examples include, but are not limited to, methoxy, ethoxy, propoxy, butoxy, cyclopropyloxy, cyclobutyloxy, cyclopentyloxy, cyclohexyloxy, and the like.

As used herein "oximo" refers an oxime. For example, oximo includes, but is not limited to, —O—N═C($R_1$)($R_2$) groups where $R_1$ and $R_2$ are any suitable substituent.

As used herein, "bond" refers to a covalent bond.

The term "substituted" means that the specified group or moiety bears one or more substituents. The term "unsubstituted" means that the specified group bears no substituents. Where the term "substituted" is used to describe a structural system, the substitution is meant to occur at any valency-allowed position on the system. In some embodiments, "substituted" means that the specified group or moiety bears one, two, or three substituents. In other embodiments, "substituted" means that the specified group or moiety bears one or two substituents. In still other embodiments, "substituted" means the specified group or moiety bears one substituent.

As used herein, "optional" or "optionally" means that the subsequently described event or circumstance may but need not occur, and that the description includes instances where the event or circumstance occurs and instances in which it does not. For example, "wherein each hydrogen atom in $C_1$-$C_{20}$ alkyl is optionally substituted with halogen," means that a halogen may be but need not be present on any of the $C_1$-$C_{20}$ alkyl by replacement of a hydrogen atom for each halogen, and the description includes situations where the $C_1$-$C_{20}$ alkyl is not substituted with the halogen.

As used herein, "independently" means that the subsequently described event or circumstance is to be read on its own relative to other similar events or circumstances. For example, in a circumstance where several equivalent hydrogen groups are optionally substituted by another group described in the circumstance, the use of "independently optionally" means that each instance of a hydrogen atom on the group may be substituted by another group, where the groups replacing each of the hydrogen atoms may be the same or different. Or for example, where multiple groups exist all of which can be selected from a set of possibilities, the use of "independently" means that each of the groups can be selected from the set of possibilities separate from any other group, and the groups selected in the circumstance may be the same or different.

An invisible-fingerprint article, sometimes called an IFP article, in accordance with the present disclosure comprises a surface of a substrate coated with an invisible-fingerprint coating, sometimes called an IFP coating. Illustratively, the invisible-fingerprint coating may be formed on a surface by a process comprising applying a formulation for an invisible-fingerprint coating onto the surface of a substrate. In some embodiments, the formulation for an invisible-fingerprint coating comprises a hydrolysate of an alkylsilane, such as a non-fluorinated alkyl silane. In some embodiments, the formulation further comprises an alkylsiloxane. In some embodiments, the formulation is applied to the surface of the substrate using spraying, chemical vapor deposition (CVD), physical vapor deposition (PVD), or pulsed laser deposition (PLD). Illustratively, it may be desirable to minimize the presence of acids, which may lead to hazing on the surface. In some embodiments, the formulation is substantially free of an acid.

In exemplary embodiments, the substrate may be a glass screen, for example as used in electronic displays, such as, but not limited to, cell phone screens, computer monitors, television screens, touch screens, appliances, heads-up displays, glasses (e.g., eyeglasses and sunglasses), masks (e.g., welding masks), interior wall paints, and the like. In exemplary embodiments, the substrate may be used in appliance equipment and cosmetic finishes fields, for example decorative panels for appliances such as domestic electrical equipment (refrigerator doors, oven doors, display cases, etc.). The substrate may be made of glass (or a screen protector, typically a polymeric plastic), glass ceramic, metal oxide, Plexiglas or other material. In some embodiments, the substrate comprises a glass, a glass ceramic, a metal oxide, or a plastic. In some embodiments, the surface is soda-lime glass or AlSiO glass. Additional substrates include interior components in cars or household objects such as casings, blinds, decorative frames and handles, sanitary fittings such as sink plugs, taps and mixers as well as general office equipment. Particularly suitable are glass and metal and metalized surfaces with low roughness (0.3-1.0 μm).

It is to be understood that in the present disclosure, the term "invisible" includes not visible, invisible, nearly invisible or inconspicuous (e.g., not visible unless the surface is scrutinized). It is to be understood that "invisibility" also depends, to an extent, on the refraction of the light and on the way one views the surface. From some angles a fingerprint may be invisible, while at other angles it may be discernable. The term "wettability" means the property whereby polar or non-polar liquids adhere to a substrate, forming an undesirable film, and also the tendency of a substrate to retain dust or dirt of all kinds, fingerprints, insects, etc. Whereas anti-fingerprint (AFP) will boost up hydrophobicity and oleophobicity, IFP selectively changes the surface tension of different fluids such as water and oil to make the surface both hydrophobic and oleophilic at the same time.

In one approach to achieve an invisible-fingerprint coating, the contact angle of water and oil can be optimized such that the resulting liquids spread across the surface and the liquid on the surfaces matches the index of refraction from the glass substrate. In such cases, the light will pass through the fingerprint and make the visible effect of an invisible fingerprint. In order to achieve this contact angle, it was demonstrated that surfaces with hydrophobic properties and oleophilic properties were desired. In one approach, to optimize the effect it was found that the water contact angle may be in the range of about 70-145 degrees and the diiodomethane contact angle may be below 45 degrees. In another approach, the water contact angle (WCA) and diiodomethane oil contact angle (OCA) of IFP are 80° and 35°, respectively. Therefore, water droplets bead up and oil droplets spread out on the substrate. Eventually by controlling the wetting phenomena on the substrate, the refractive index of the substrate and surface match with each other and finger prints become less visible. This matching phenomenon allows light to pass through the fingerprint without refraction or reflection, giving the optical illusion that the fingerprint smudge is not present.

In illustrative embodiments, the article comprises a substrate and a coating, such as an invisible-fingerprint coating or an IFP coating, deposited on the surface of the substrate. In some embodiments, the invisible-fingerprint coating comprises a non-fluorinated alkyl silane hydrolysate polymer.

Illustratively, the substrate may be may be made of glass, a polymer, glass ceramic, metal oxide, Plexiglas or other material. In some embodiments, the substrate comprises a glass, a glass ceramic, a wood, a metal, a metal oxide, or a polymer.

The coating can be a particular thickness as measured by the distance from the surface of the substrate. In some embodiments, the coating is less than about 1000 nm. In some embodiments, the thickness is greater than 0.1 nm. In some embodiments, the thickness is about 5 nm to about 300 nm.

Delta E is a measured difference between clean, or virgin, glass and fingerprinted glass. By using a colorimeter (PCE instruments) and calculating the Delta E using the equation—square root of L2+A2+B2. This resulting E value is measured on virgin glass compared to post fingerprinted or post wiped to get Delta E. Illustratively, the lower the value of delta E, the more invisible. In another embodiment, delta haze can be measured using spectrophotometry. In some embodiments, the relative enhancement is similar from anti-fingerprint coatings to invisible fingerprint coatings. Illustratively, the delta E is relative to an anti-fingerprint coating, such as a perfluorinated silane. Illustratively, the lower the delta E the more invisible the fingerprints are on the surface. Delta E can also be measured after wiping the surface to determine how cleanly the fingerprint is removed.

In some embodiments, the delta E may be less than about 3, less than about 2, less than about 1, less than about 0.8, or less than about 0.5. In some embodiments, the delta E is about 0.05, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.2, about 2.5, or about 3. In some embodiments, the delta E is in a range of about 0.1 to about 2, about 0.1 to about 1.5, about 0.1 to about 1, about 0.2 to about 1, about 0.3 to about 1, or about 0.4 to about 0.9. In a second series of ranges, the delta E may be about 0.05 to about 1.2, about 0.05 to about 0.9, about 0.05 to about 0.8, or about 0.05 to about 0.5.

In some embodiments, the invisible-fingerprint surface has an initial oil angle using diiodomethane ($CH_2I_2$) as measured according to the Examples. In some embodiments, the initial oil angle is less than about 60°, less than about 50°, less than about 45°, less than about 40°, less than about 35°, or less than about 30°. In some embodiments, the initial oil angle of the invisible-fingerprint surface is about 20°, about 21°, about 22°, about 23°, about 24°, about 25°, about 26°, about 27°, about 28°, about 29°, about 30°, about 31°, about 32°, about 33°, about 34°, about 35°, about 37°, about 40°, about 45°, about 50°, about 55°, or about 60°. In some embodiments, the initial oil angle of the invisible-fingerprint surface may be in a range of about 20° to about 60°, about 20° to about 50°, about 20° to about 40°, about 20° to about 35°, or about 20° to about 30°.

In some embodiments, the invisible-fingerprint surface has an initial water angle as measured according to the Examples. In some embodiments, the initial water angle is greater than about 60°, greater than about 65°, greater than about 70°, greater than about 75°, greater than about 80°, greater than about 90°, or greater than about 100°. In some embodiments, the initial water angle of the invisible-fingerprint surface is about 60°, about 65°, about 70°, about 75°, about 76°, about 77°, about 78°, about 79°, about 80°, about 81°, about 82°, about 83°, about 84°, about 85°, about 86°, about 87°, about 88°, about 89°, about 90°, about 95°, about 100°, about 105°, about 110°, or about 115°. In some embodiments, the initial water angle of the invisible-fingerprint surface may be in a range of about 60° to about 115°, about 60° to about 110°, about 70° to about 110°, about 70° to about 95°, or about 75° to about 95°.

In some embodiments, the invisible-fingerprint surface has a particular abrasion resistance as measured by the water angle or oil angle after a certain number of cycles, as described in the Examples.

Illustratively, the invisible-fingerprint surface may have a particular oil angle after enduring about 1,500 cycles, about 3,000 cycles, about 4,000 cycles, or about 5,000 cycles as described in the Examples. Illustratively, the post-abrasion oil angle is less than about 60°, less than about 50°, less than about 45°, less than about 40°, less than about 35°, or less than about 30°. In some embodiments, the post-abrasion oil angle of the invisible-fingerprint surface is about 20°, about 21°, about 22°, about 23°, about 24°, about 25°, about 26°, about 27°, about 28°, about 29°, about 30°, about 31°, about 32°, about 33°, about 34°, about 35°, about 37°, about 40°, about 45°, about 50°, about 55°, or about 60° after 1,500 cycles, about 3,000 cycles, about 4,500 cycles, or about 5,000 cycles. In some embodiments, the post-abrasion oil angle of the invisible-fingerprint surface may be in a range of about 20° to about 60°, about 20° to about 50°, about 20° to about 40°, about 20° to about 35°, or about 20° to about 30° after 1,500 cycles, about 3,000 cycles, about 4,500 cycles, or about 5,000 cycles.

Illustratively, the invisible-fingerprint surface may have a particular water angle after enduring about 1,500 cycles, about 3,000 cycles, about 4,500 cycles, or about 5,000 cycles as described in the Examples. Illustratively, the post-abrasion water angle may be greater than about 40°, greater than about 50°, greater than about 55°, or greater than about 60°. In some embodiments, the post-abrasion water angle of the invisible-fingerprint surface is about 40°, about 50°, about 55°, about 60°, about 65°, about 70°, about 75°, about 80°, or about 85° after 1,500 cycles, 3,000 cycles, or 4,500 cycles. In some embodiments, the post-abrasion water angle of the invisible-fingerprint surface may be in a range of about 40° to about 85°, about 50° to about 85°, about 50° to about 80°, or about 60° to about 80° after 1,500 cycles, about 3,000 cycles, about 4,500 cycles, or about 5,000 cycles. In some embodiments, the invisible-fingerprint coating is able to maintain a water contact angle of at least 50 degrees after 1500 cycles of eraser abrasion.

In illustrative embodiments, the invisible-fingerprint surface has a particular coefficient of friction. In some embodiments, the coefficient of friction is less than about 0.2 or less than about 0.15. In some embodiments, the coefficient of friction is about 0.08, about 0.09, about 0.1, about 0.11, about 0.12, about 0.13, about 0.14, or about 0.15. In some embodiments, the coefficient of friction is in a range of about 0.08 to about 0.15 or about 0.09 to about 0.13.

In some embodiments, the invisible-fingerprint coating is formed by applying a formulation for an invisible-fingerprint coating onto a substrate. In some embodiments, the formulation for an invisible-fingerprint coating comprises a hydrolysate of an alkyl silane.

The hydrolysate of the alkyl silane, sometimes called the hydrolysate polymer, may be formed by a process comprising contacting an alkyl silane with an acid or a base. In exemplary embodiments, the hydrolysate is formed by contacting an alkyl silane with an acid. In exemplary embodiments, the hydrolysate is formed by contacting an alkyl silane with an acid in a solvent. In some embodiments, the hydrolysate polymer is formed in the absence of an acid.

Acids that may be used for forming the hydrolysate include mineral acids and organic acids. Exemplary mineral acids include hydrochloric acid, nitric acid, sulfuric acid, a mixture thereof, or other mineral acids known in the art. In some embodiments, the acid is nitric acid. In some embodiments, the acid is acetic acid.

In illustrative embodiments, the acid is present at a particular concentration. Illustratively, the acid is present at a concentration of at least about 0.01% by volume. The acid may be present at an amount of about 0.01%, about 0.02%, about 0.03%, about 0.04%, about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 15%, about 20%, about 25%, or about 50% by volume. The acid may be present in a range of about 0.01% to about 50%, about 0.01% to about 15%, about 0.01% to about 10%, about 0.01% to about 5%, about 0.05% to about 5%, about 0.05% to about 3%, about 0.05% to about 1%, or about 0.05% to about 0.15%.

In some embodiments, the hydrolysate is formed by contacting an alkyl silane with a base. Illustrative bases include potassium hydroxide.

In some embodiments, the hydrolysate is formed by combining an alkyl silane with titanium butoxide, levasil, and an acid. In some embodiments, the acid is acetic acid.

In illustrative embodiments, the step of forming the hydrolysate is performed in a solvent. In some embodiments, the solvent comprises an alcohol, an organic solvent, or a mixture thereof. In some embodiments, the alcohol is an alkyl alcohol. In some embodiments, the alcohol is a $C_1$-$C_{10}$ alkyl-OH or a $C_1$-$C_6$ alkyl-OH. Illustrative alkyl alcohols include methanol, ethanol, propanol, isopropanol, or butanol. Illustrative organic solvents include chlorinated solvents and nonchlorinated solvents. Illustrative chlorinated solvents include dichloromethane. In some embodiments, the solvent comprises water.

In some embodiments, the solvent is a blend of water and an alcohol. In some embodiments, the alcohol is a $C_1$-$C_{10}$ alkyl-OH or a $C_1$-$C_6$ alkyl-OH. In some embodiments, the water and the alcohol are present in a weight ratio of water to the alcohol of about 1:1000 to about 1000:1. In some embodiments, the water and the alcohol are present in molar a ratio of water to the alcohol of about 1:1000 to about 1000:1. In some embodiments, the molar ratio is 1:20 to 20:1. In some embodiments, the water to alcohol, such as ethanol, molar ratio is 1:2, 1:1, 2:1, or 3:1. In some illustrative embodiments, by controlling the amount of water to alcohol ratio in the solvent, it may be possible to produce hydrolysates of varying molecular weights and varying percentage of conversion from starting material to final product. The conversion of monomer to oligomer or polymer may be determined by the water to ethoxy ratio of the reaction done at reflux overnight.

The solvent for the step of forming the hydrolysate can have a particular pH. In some embodiments, the pH is between 0 and 14 or between 6 and 8.

The step of contacting, sometimes called the step of polymerizing, can be performed for a particular amount of time. In some embodiments, the particular time is the time before being quenched. In some embodiments, the step of contacting is performed for at least 3 minutes. In some embodiments, the step of contacting is performed for less than 4 hours. In illustrative embodiments, the step of contacting is performed for about 3 minutes, about 5 minutes, about 10 minutes, about 15 minutes, about 20 minutes, about 25 minutes, about 30 minutes, about 35 minutes, about 40 minutes, about 45 minutes, about 50 minutes, about 1 hour, about 2 hours, about 3 hours, or about 4 hours. In some embodiments, the step of polymerizing can be performed for about 0.1 hours to about 72 hours. In some embodiments, the step of polymerizing can be performed for about 0.1 hours to about 20 hours, or preferably about 12 hours.

The step of contacting, sometimes called the step of polymerizing, can be at a particular temperature or range of particular temperatures. In some embodiments, the step is performed at the reflux temperature of the solvent. In some embodiments, the step is performed at room temperature. In some embodiments, the step is performed at a temperature less than room temperature. In some embodiments, the step is performed a temperature of about −10° C. up to reflux of the solvent.

The process for forming the hydrolysate may include a step of quenching the step of contacting. In illustrative embodiments, the step or quenching is performed by adding an aqueous solution. In illustrative embodiments, the aqueous solution comprises a base. Exemplary bases include sodium bicarbonate. In some embodiments, the aqueous solution is substantially free of a base. In some embodiments, the process does not include a step of quenching.

In illustrative embodiments, the step of forming the hydrolysate includes a step of concentrating. In exemplary embodiments, the step of concentrating is performed after the step of quenching. Alternatively, in exemplary embodiments the process does not include a step of quenching so the step of concentrating occurs immediately after the step of forming/polymerizing. Illustratively, the step of concentrating is performed under vacuum.

In some embodiments, the process includes a step of purifying the hydrolysate. In some embodiments, the step of purifying include washing the hydrolysate to remove, for example, acids or any catalyst that may be present. Illustratively, the washing can be performed by washing with water.

In some embodiments, the alkyl silane is of the formula $(R^A)_3SiR^B$,

In some embodiments, each $R^A$ is independently —$OC_1$-$C_{10}$ alkyl, —$OC_6$-$C_{10}$ alkylaryl, —$OC_2$-$C_{10}$ alkenyl, or —$OC_3$-$C_{10}$ alkynyl. In some embodiments, each $R^B$ is $C_1$-$C_{20}$ alkyl, $C_6$-$C_{20}$ alkylaryl, $C_2$-$C_{20}$ alkenyl, or $C_2$-$C_{20}$ alkynyl. In some embodiments, each hydrogen atom in —$OC_1$-$C_{10}$ alkyl, —$OC_6$-$C_{10}$ alkylaryl, —$OC_2$-$C_{10}$ alkenyl, —$OC_3$-$C_{10}$ alkynyl, $C_1$-$C_{20}$ alkyl, $C_6$-$C_{20}$ alkylaryl, $C_2$-$C_{20}$ alkenyl, or $C_2$-$C_{20}$ alkynyl is independently optionally substituted with deuterium, halogen, —OH, —CN, —$OR^1$, —$CO_2H$, $C(O)OR^1$, —$C(O)NH_2$, —$C(O)NH(C_1$-$C_6$ alkyl), —$C(O)N(C_1$-$C_6$ alkyl$)_2$, $SC_1$-$C_6$ alkyl, $S(O)C_1$-$C_6$ alkyl, —$S(O)_2C_1$-$C_6$ alkyl, —$S(O)NH(C_1$-$C_6$ alkyl), —$S(O)_2NH(C_1$-$C_6$ alkyl), $S(O)N(C_1$-$C_6$ alkyl$)_2$, —$S(O)_2N(C_1$-$C_6$ alkyl$)_2$, —$NH_2$, $NH(C_1$-$C_6$ alkyl), —$N(H)C_1$-$C_6$ alkyl-$NH_2$, —$N(H)C_1$-$C_6$ alkyl-Si(—$OC_1$-$C_6$ alkyl$)_3$, —$N(R^1)C_1$-$C_6$ alkyl-$N(R^1)C_1$-$C_6$ alkyl-Si(—$OC_1$-$C_6$ alkyl$)_3$-$N(H)C_1$-$C_6$ alkyl-$N(H)$ $C_1$-$C_6$ alkyl-$NH_2$, —$P(C_1$-$C_6$ alkyl$)_2$, —$P(O)(C_1$-$C_6$ alkyl$)_2$, —$PO_3H_2$, or —$Si(—OC_1$-$C_6$ alkyl$)_3$. In some embodiments, each $R^1$ if present is independently deuterium, $C_1$-$C_{10}$ alkyl, $C_1$-$C_{10}$ alkylaryl, $C_2$-$C_{10}$ alkenyl, $C_2$-$C_{10}$ alkynyl, $C_3$-$C_6$ cycloalkyl, $C_3$-$C_6$ cycloalkylaryl, or —$C_1$-$C_{10}$ alkyl-O—$C_1$-$C_{10}$ alkyl, $C_1$-$C_{10}$ alkylaryl-O—$C_1$-$C_{10}$ alkylaryl. In some embodiments, each hydrogen atom in $C_1$-$C_{10}$ alkyl, $C_1$-$C_{10}$ alkylaryl in $R^1$ is optionally substituted with hydroxyl. It should be understood that while some embodiments 11-chloroundecyltriethoxysilane is described as "CLAS," such an abbreviation is solely for the sake of brevity and is in no way intended to limit "CLAS" to 11-chloroundecyl-triethoxysilane.

In some embodiments, $R^B$ is $C_1$-$C_{20}$ alkyl, $C_2$-$C_{20}$ alkenyl, or $C_2$-$C_{20}$ alkynyl. Illustratively, each hydrogen atom in $C_1$-$C_{20}$ alkyl, $C_2$-$C_{20}$ alkenyl, or $C_2$-$C_{20}$ alkynyl is independently optionally substituted with deuterium, halogen, —OH, —CN, —$OR^1$, —$CO_2H$, —$C(O)OR^1$, —$C(O)NH_2$, $C(O)NH(C_1$-$C_6$ alkyl), —$C(O)N(C_1$-$C_6$ alkyl$)_2$, $SC_1$-$C_6$ alkyl, $S(O)C_1$-$C_6$ alkyl, —$S(O)_2C_1$-$C_6$ alkyl, —$S(O)NH(C_1$- $C_6$ alkyl), —$S(O)_2NH(C_1$-$C_6$ alkyl), $S(O)N(C_1C_6$ alkyl$)_2$, —$S(O)_2N(C_1$-$C_6$ alkyl$)_2$, —$NH_2$, $NH(C_1$-$C_6$ alkyl), —$N(H)$ $C_1$-$C_6$ alkyl-$NH_2$, —$N(H)C_1$-$C_6$ alkyl-Si(—$OC_1$-$C_6$ alkyl$)_3$, —$N(R^1)C_1$-$C_6$ alkyl-$N(R^1)C_1$-$C_6$ alkyl-Si(—$OC_1$-$C_6$ alkyl$)_3$-$N(H)C_1$-$C_6$ alkyl-$N(H)$ $C_1$-$C_6$ alkyl-$NH_2$, —$P(C_1$-$C_6$ alkyl$)_2$, —$P(O)(C_1$-$C_6$ alkyl$)_2$, —$PO_3H_2$, or —$Si(—OC_1$-$C_6$ alkyl$)_3$. Each $R^1$, if present, is independently deuterium, $C_1$-$C_6$ alkyl, $C_2$-$C_6$ alkenyl, $C_2$-$C_6$ alkynyl, $C_3$-$C_6$ cycloalkyl, or —$C_1$-$C_6$ alkyl-O—$C_1$-$C_6$ alkyl, wherein each hydrogen atom in $C_1$-$C_6$ alkyl is optionally substituted with hydroxy.

In some embodiments, $R^B$ is optionally substituted $C_6$-$C_{20}$ alkyl. In an illustrative embodiment, each hydrogen atom in $C_6$-$C_{20}$ alkyl is independently optionally substituted by halogen, —OH, —CN, —$OR^1$, —$CO_2H$, —$NH_2$, $NH(C_1$-$C_6$ alkyl), —$N(C_1$-$C_6$ alkyl$)_2$, —$P(C_1$-$C_6$ alkyl$)_2$, —$P(O)$ $(C_1$-$C_6$ alkyl$)_2$, —$PO_3H_2$, wherein $R^1$ is independently deuterium or —$C_1$-$C_6$ alkyl-O—$C_1$-$C_6$ alkyl. In some embodiments, alkyl silane is selected from the group consisting of ((chloroundecyl)(triethoxy)silane, (chloroundecyl)(trimethoxy)silane, (chloromethylene)(trimethoxy)silane, (chloromethylene)(triethoxy)silane, (chloroethyl)(trimethoxy)silane, (chloroethyl)(triethoxy)silane, (chloropropyl)(trimethoxy)silane, (chloropropyl)(triethoxy)silane, (chlorobutyl)(trimethoxy)silane, (chlorobutyl)(triethoxy)silane, (chloropentyl)(trimethoxy)silane, (chloropentyl)(triethoxy)silane, (chlorohexyl)(triethoxy)silane, (chlorohexyl)(trimethoxy)silane, (chloroheptyl)(trimethoxy)silane, (chloroheptyl)(triethoxy)silane, (chlorooctyl)(trimethoxy)silane, (chlorooctyl)(triethoxy)silane, (chlorononyl)(trimethoxy)silane, (chlorononyl)(triethoxy)silane 11-(2-methoxyethoxy)undecyltrimethoxysilane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl)(triethoxy)silane; (phosphoundecyl)(triethoxy)silane. In some embodiments, the alkyl silane is 11-chloroundecyltriethoxysilane.

Illustratively, the halogen may be chloro, bromo, or iodo. In some embodiments, the alkyl silane comprises a halogen but does not comprise a fluoro.

In some embodiments, the alkylsilane is bifunctional. Illustratively, bifunctional silanes can be considered crosslinking silanes or chain extenders in embodiments having more than one alkyl silane. Illustrative bifunctional alkylsilanes include haloalkyl silanes, bisalkyl silanes, bisalkoxy silanes, aminoalkyl silanes, hydroxyalkyl silanes, and phosphatealkyl silanes. Ilustrative bisalkyl silanes include bis triethoxy octyl silane and bis(trimethoxysilyl) 4-oxa-8-azundecan-6-ol. Illustrative haloalkyl silanes include chloroundecyl silane and chlorohexyl silane. Illustrative aminoalkyl silanes include aminoundecyl silane, N-2-aminoethyl-11-aminoundecyl trihexoxy silane, and N-6-aminohexyl aminomethyl triethoxy silane. Illustrative hydroxyalkyl silanes include OH-decyl triethoxy silane. Illustrative phosphatealkyl silanes include phosphate undecyl triethoxy silane.

Illustrative crosslinking silanes include a crosslinking silane selected from the group consisting of formulas (I)-(IV):

$(SiX_n)—Y^1$ (I)

$(SiX_n)—Y^2—(SiX_n)$ (II)

$(SiX_n)—Y^3—(SiX_n)—(SiX_n)$, and (III)

$(SiX_n)—(SiX_n)—Y^4—(SiX_n)—(SiX_n)$ (IV)

In some embodiments, $Y^1$ is a $(C_2-C_{30})$ linear, branched or cyclo alkyl, aryl alkyl, alkyl aryl and each silicon in the formula (I) is bonded to the same or different carbon in atom $Y^1$. In some embodiments, $Y^2$ is a $(C_2-C_{30})$ linear, branched or cyclo alkyl, aryl alkyl, alkyl aryl and each silicon in the formula (II) is bonded to the same or different carbon in atom $Y^2$. In some embodiments, $Y^3$ is a $(C_2-C_{30})$ linear, branched or cyclo alkyl, aryl alkyl, alkyl aryl and each silicon in the formula (III) is bonded to the same or different carbon in atom $Y^3$. In some embodiments, $Y^4$ is a $(C_2-C_{30})$ linear, branched or cyclo alkyl, aryl alkyl, alkyl aryl and each silicon in the formula (IV) is bonded to the same or different carbon in atom $Y^4$. In some embodiments, each X is independently a monovalent leaving group selected from halogen, $(C_1-C_6)$ alkoxy, $(C_2-C_6)$ carboxy, and $(C_1-C_6)$ oximo, $(C_1-C_6)$ aryl alkoxy. In some embodiments, n is an integer greater than or equal to 1 and less than or equal to 3. By adding chain extenders such as BIS or TRIS silanes, at varying ratios to of the alkyl silane, such as 11-chloroundecyltriethoxysilane, it may be possible to increase the molecular weight of the final polymer, which may increase the durability of the final product. The tune-ability of this approach may enable customizable 11-chloroundecyltriethoxysilane hydrolysates which can be tuned for better performance. In some embodiments, the end result is an IFP coating, which may be able to be deposited in mass production with high performance and ease. An illustrative BIS silane is 1,2-Bis(triethoxysilyl) ethane. It should be understood that while some embodiments 1,2-Bis(triethoxysilyl) ethane is described as "BIS," such an abbreviation is solely for the sake of brevity and is in no way intended to limit "BIS" to 1,2-Bis(triethoxysilyl) ethane. An illustrative TRIS silane is 1,1,2-Tris(triethoxysilyl) ethane. It should be understood that while some embodiments 1,1,2-Tris(triethoxysilyl) ethane is described as "TRIS," such an abbreviation is solely for the sake of brevity and is in no way intended to limit "TRIS" to 1,1,2-Tris(triethoxysilyl) ethane.

In some embodiments, the step of contacting further contains an alkoxy siloxane. In some embodiments, the alkoxy silane is a trialkoxy siloxane. In some embodiments, the dialkyl siloxane is formed by contacting a vinyl-terminated dialkyl siloxane with a compound of formula $(R^cO)_3SiH$, where $R^c$ is an alkyl group. In some embodiments, the siloxane is an alkyl siloxane. In some embodiments, the alkoxy siloxane is an alkoxy polydimethylsiloxane. In some embodiments, the alkoxy siloxane is a trialkoxy polydimethylsiloxane.

In illustrative embodiments, the trialkoxy siloxane is formed by reacting a trialkoxy silane with a commercially available siloxane in the presence of a catalyst. Illustrative siloxanes include polydimethyl siloxane, available from Gelest. In some embodiments, the catalyst is a platinum catalyst.

Illustratively, the formed hydrolysate, sometimes called the hydrolysate polymer, comprises species with a higher molecular weight when compared to the alkyl silane. In some embodiments, the formed hydrolysate comprises species having a molecular weight of at least 1,000 Da, at least about 2,000 Da, or at least about 3,000 Da. In some embodiments, the formed hydrolysate comprises species of about 1,000 Da, about 1,500 Da, about 2,000 Da, about 2,500 Da, about 3,000 Da, about 3,500 Da, about 4,000 Da, about 4,500 Da, about 5,000 Da, about 5,500 Da, about 6,000 Da, about 6,500 Da, about 7,000 Da, about 7,500 Da, about 8,000 Da, about 9,000 Da, or about 10,000 Da. In some embodiments, the formed hydrolysate polymer comprises species of at least about 300 Da or at least about 500 Da.

In some embodiments, the hydrolysate polymer has a weight average molecular weight (Mw) of less than about 100,000 Da or less than about 50,000 Da. In some embodiments, the hydrolysate polymer has a weight average molecular weight (Mw) of at least about 300 Da, at least about 500 Da, at least about 600 Da, or at least about 1,000 Da. In some embodiments, the hydrolysate polymer has a weight average molecular weight (Mw) in a first set of ranges of about 300 Da to about 100,000 Da, about 500 Da to about 100,000 Da, about 500 Da to about 50,000 Da, about 500 Da to about 25,000 Da, about 500 Da to about 10,000 Da, or about 500 Da to about 5,000 Da. In some embodiments, the hydrolysate polymer has a weight average molecular weight (Mw) in a second set of ranges of about 500 Da to about 100,000 Da, about 1,000 Da to about 100,000 Da, about 10,000 Da to about 100,000 Da, about 15,000 Da to about 100,000 Da, or about 30,000 Da to about 100,000.

In some embodiments, the hydrolysate polymer has a number average molecular weight (Mn) of less than about 100,000 Da or less than about 50,000 Da. In some embodiments, the hydrolysate polymer has a number average molecular weight (Mn) of at least about 300 Da, at least about 500 Da, at least about 600 Da, or at least about 1,000 Da. In some embodiments, the hydrolysate polymer has a number average molecular weight (Mn) in a first set of ranges of about 300 Da to about 100,000 Da, about 500 Da to about 100,000 Da, about 500 Da to about 50,000 Da, about 500 Da to about 25,000 Da, about 500 Da to about 10,000 Da, or about 500 Da to about 5,000 Da. In some embodiments, the hydrolysate polymer has a number average molecular weight (Mn) in a second set of ranges of about 500 Da to about 100,000 Da, about 1,000 Da to about 100,000 Da, about 10,000 Da to about 100,000 Da, about 15,000 Da to about 100,000 Da, or about 30,000 Da to about 100,000.

In some embodiments, the hydrolysate polymer has a polydispersity index (Mw/Mn) of at least about 1.1 or at least about 1.2. In some embodiments, the hydrolysate polymer has a polydispersity index (Mw/Mn) of less than about 1.8 or less than about 1.7. In some embodiments, the hydrolysate polymer has a polydispersity index of about 1.1, about 1.2, about 1.3, about 1.4, about 1.5, about 1.6, about 1.7, or about 1.8.

In some illustrative embodiments, the hydrolysate polymer may comprise some or all of blocks A-F, as shown below.

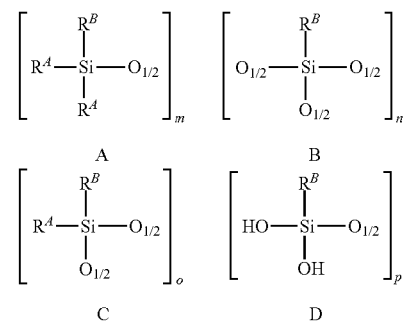

-continued

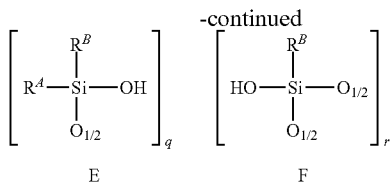

E F where $R^A$ and $R^B$ are defined as above. Each of m, n, o, p, q, and r are independently integers. Illustratively, each integer may be independently 0 to 500. Illustratively, in some embodiments, some or all of blocks A-F are present in the hydrolysate polymer. For example, blocks A, F, and D can combine to form the following exemplary structure but not limited to:

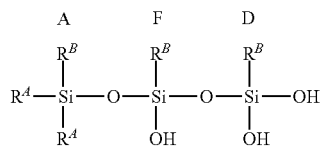

where the illustrative $O_{1/2}$ of each block are combined to link two silicon atoms. Although the above structure is linear as shown, the blocks can also combine in three-dimensional shapes, as shown in an example below but not limited to:

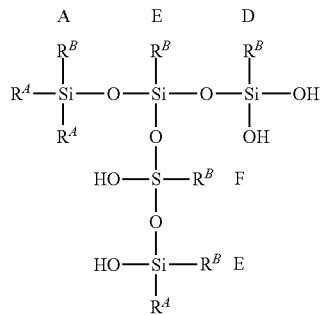

It is contemplated in illustrative embodiments that the hydrolysate polymer contains linear stretches of blocks selected from the group consisting of A, B, C, D, E, F, and combinations thereof, and branched segments of blocks selected from the group consisting of A, B, C, D, E, F, and combinations thereof. Without being bound by theory, the amount of water present in the polymerization may influence the degree of branching and polymerization.

The concentration of the hydrolysate polymer in the formulation for an invisible-fingerprint coating may be a particular concentration in a solvent. In some embodiments, the hydrolysate is present at a concentration of at least 1 g/l. In some embodiments, the hydrolysate is present at a concentration of about 1 g/l to about 10 g/l, 1 g/l to about 6 g/l, about 1 g/l to about 5 g/l, about 2 g/l to about 5 g/l, or about 3 g/l to about 5 g/l. In some embodiments, the hydrolysate may be at a concentration of about 1 g/l, about 2 g/l, about 3 g/l, about 3.25 g/l, about 3.5 g/l, about 3.75 g/l, about 4 g/l, about 4.25 g/l, about 4.5 g/l, about 5 g/l, about 5.5 g/l, about 6 g/l, about 7 g/l, about 8 g/l, about 9 g/l, or about 10 g/l. In some embodiments, the hydrolysate is at a concentration of about 0.01 mg/L to about 100 g/L.

In some embodiments, the formulation for an invisible-fingerprint coating comprises a solvent. In some embodiments, the solvent is an organic solvent. In some embodiments, the solvent comprises water, an alcohol, or a mixture thereof. In some embodiments, the alcohol is a $C_1$-$C_6$ alkyl-OH. In some embodiments, the solvent is methanol, ethanol, propanol, butanol, pentanol, hexanol, or a combination thereof. In illustrative embodiments, the formulation for an invisible-fingerprint coating is substantially free of an acid. In illustrative embodiments, the solvent is substantially free of an acid.

Illustratively, the formulation for an invisible-fingerprint surface can be applied to a substrate to form the invisible-fingerprint surface by a particular method. In some embodiments, a method for forming an invisible-fingerprint coating on a substrate comprises a step of applying. In some embodiments, the method comprises a step of curing. In some embodiments, the method comprises a step of applying and a step of curing. In some illustrative embodiments, as the hydrolysate polymer is cured on the surface, the hydrolysate polymer bonds to the surface of the substrate, for example to free hydroxy groups on the surface.

In some embodiments, the step of applying is performed by dipping, wiping, spraying the formulation for an invisible-fingerprint coating onto the surface of the substrate, chemical vapor deposition (CVD), physical vapor deposition (PVD), or pulsed laser deposition (PLD).

In some embodiments, the process for forming an invisible-fingerprint coating on a substrate comprises applying by PVD a formulation for an invisible-fingerprint coating to a surface of the substrate. Illustratively, the step of applying can be performed by thermal evaporation. In some embodiments, the process comprises curing the formulation on the surface of the substrate. In some embodiments, the process comprises a step of cleaning the surface of the substrate. In some embodiments, the step of cleaning is performed before the step of applying. In some embodiments, the formulation is in the form of a pellet. In some embodiments, the process comprises a step of forming the pellet of the formulation. In some illustrative embodiments, the step of forming the pellet comprises contacting a steel wool or copper foam with the hydrolysate.

Illustratively, the step of curing can be performed at an elevated temperature or at room temperature. In some embodiments, the step of curing is performed at room temperature. In some embodiments, the step of curing is performed at least about 70° C., at least about 80° C., at least about 90° C., or at least about 100° C. In some embodiments, the step of curing is performed at a temperature of about 80° C., about 90° C., about 100° C., about 110° C., about 120° C., about 125° C., about 130° C., or about 140° C. In some embodiments, the step of curing is performed at a temperature greater than or equal to 20° C. and less than or equal to 250° C. In some embodiments, if the curing is performed by heating, the hydrolysate polymer may further condense with itself to form higher molecular weight species as compared to the molecular weight species present in the formulation.

In some embodiments, the step of curing is performed for a duration of time to allow the formulation to cure and may be dependent on the temperature used for the step of curing. In some embodiments, the step of curing is performed overnight. In some embodiments, the step of curing is performed for at least about 5 minutes, at least about 10 minutes, or at least about 30 minutes. In some embodiments, the step of curing is performed for about 10 minutes, about 15 minutes, about 20 minutes, about 25 minutes, about 30 minutes, about 45 minutes, about 1 hour, about 2 hours, about 3 hours, about 4 hours, about 6 hours, about 12 hours, or overnight. In some embodiments, the step of curing is performed at a temperature of about 120° C. for about 10 minutes. In some embodiments, the step of curing is performed at a temperature of about 80° C. for about 1 hour. In some embodiments, the step of curing is performed at room temperature overnight. In some embodiments, the step of curing is performed at a temperature of about 120° C. for about 30 min. In some embodiments, the step of curing is performed for greater than or equal to 0.1 hours and less than or equal to 48 hours.

In some embodiments, the method comprises a step of activating the surface of the substrate by exposing the surface to a plasma of at least one gas selected from the group consisting of inert gases, $N_2$, $O_2$, and a mixture of at least two of the foregoing gases.

In illustrative embodiments, the formulation for an invisible-fingerprint coating is deposited by dip, spray, thermal CVD (chemical vapor deposition), physical vapor deposition (PVD), or pulsed laser deposition (PLD), under conditions enabling a RMS (root mean square) surface roughness of between 5 and 100 nm to be obtained. In exemplary embodiments, a RMS (root mean square) surface roughness of between 5 and 10 nm can be obtained.

Although only a number of exemplary embodiments have been described in detail above, those skilled in the art will readily appreciate that many modifications are possible in the exemplary embodiments without materially departing from the novel teachings and advantages. The following numbered first set of clauses include embodiments that are contemplated and non-limiting:

Clause 1. An invisible-fingerprint surface comprising an invisible-fingerprint coating made by a process comprising forming a low molecular weight alkyl silane hydrolysate,
applying a formulation comprising the low molecular weight alkyl silane hydrolysate onto a surface of a substrate,
wherein a portion of the low molecular weight alkyl silane hydrolysate has a molecular weight of about 5,000 Da.

Clause 2. The invisible-fingerprint surface of clause 1, wherein the step of forming comprises contacting an alkyl silane with an acid.

Clause 3. The invisible-fingerprint surface of any of the preceding clauses or combination of clauses, wherein the alkyl silane is of the formula

$(R^A)_3SiR^B$, wherein each $R^A$ is independently —$OC_1$-$C_6$ alkyl, —$OC_2$-$C_6$ alkenyl, or —$OC_3$-$C_6$ alkynyl; and $R^B$ is $C_1$-$C_{20}$ alkyl, $C_2$-$C_{20}$ alkenyl, or $C_2$-$C_{20}$ alkynyl; wherein each hydrogen atom in $OC_1$-$C_6$ alkyl, —$OC_1$-$C_6$ alkenyl, —$OC_1$-$C_6$ alkynyl; $C_1$-$C_{20}$ alkyl, $C_2$-$C_{20}$ alkenyl, or $C_2$-$C_{20}$ alkynyl is independently optionally substituted with deuterium, halogen, —OH, —CN, —$OR^1$, —$CO_2H$, —$C(O)OR^1$, —$C(O)NH_2$, $C(O)NH$ ($C_1$-$C_6$ alkyl), —$C(O)N(C_1$-$C_6$ alkyl)$_2$, $SC_1$-$C_6$ alkyl, $S(O)C_1$-$C_6$ alkyl, —$S(O)_2C_1$-$C_6$ alkyl, —$S(O)NH(C_1$-$C_6$ alkyl), —$S(O)_2NH(C_1$-$C_6$ alkyl), $S(O)N(C_1C_6$ alkyl)$_2$, —$S(O)_2N(C_1$-$C_6$ alkyl)$_2$, —$NH_2$, $NH(C_1$-$C_6$ alkyl), —$N(H)C_1$-$C_6$ alkyl-$NH_2$, —$N(H)C_1$-$C_6$ alkyl-Si(—$OC_1$-$C_6$ alkyl)$_3$, —$N(R^1)C_1$-$C_6$ alkyl-$N(R^1)C_1$-$C_6$ alkyl-Si(—$OC_1$-$C_6$ alkyl)$_3$-$N(H)C_1$-$C_6$ alkyl-$N(H)$ $C_1$-$C_6$ alkyl-$NH_2$, —$P(C_1$-$C_6$ alkyl)$_2$, —$P(O)(C_1$-$C_6$ alkyl)$_2$, —$PO_3H_2$, or —Si(—$OC_1$-$C_6$ alkyl)$_3$; and wherein each $R^1$ is independently deuterium, $C_1$-$C_6$ alkyl, $C_2$-$C_6$ alkenyl, $C_2$-$C_6$ alkynyl, $C_3$-$C_6$ cycloalkyl, or —$C_1$-$C_6$ alkyl-O—$C_1$-$C_6$alkyl, wherein each hydrogen atom in $C_1$-$C_6$ alkyl is optionally substituted with hydroxy.

Clause 4. The invisible-fingerprint surface of any of the preceding clauses or combination of clauses, wherein $R^A$ is —$OC_1$-$C_6$ alkyl.

Clause 5. The invisible-fingerprint surface of any of the preceding clauses or combination of clauses, wherein $R^B$ is $C_6$-$C_{20}$ alkyl.

Clause 6. The invisible-fingerprint surface of any of the preceding clauses or combination of clauses, wherein $R^B$ is $C_6$-$C_{20}$ alkyl and each hydrogen atom in $C_6$-$C_{20}$ alkyl is independently optionally substituted by halogen, —OH, —CN, —$OR^1$, —$CO_2H$, —$NH_2$, $NH(C_1$-$C_6$ alkyl), —$N(C_1$-$C_6$ alkyl)$_2$, —$P(C_1$-$C_6$ alkyl)$_2$, —$P(O)(C_1$-$C_6$ alkyl)$_2$, —$PO_3H_2$, wherein $R^1$ is independently deuterium or —$C_1$-$C_6$alkyl-O—$C_1$-$C_6$alkyl.

Clause 7. The invisible-fingerprint surface of any of the preceding clauses or combination of clauses, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl) (triethoxy)silane; (phosphoundecyl)(triethoxy)silane.

Clause 8. The invisible-fingerprint surface of any of the preceding clauses or combination of clauses, wherein the alkyl silane is 11-chloroundecyltriethoxysilane.

Clause 9. The invisible-fingerprint surface of any of the preceding clauses or combination of clauses, wherein the acid comprises a mineral acid.

Clause 10. The invisible-fingerprint surface of any of the preceding clauses or combination of clauses, wherein the mineral acid is hydrochloric acid, nitric acid, sulfuric acid, or a mixture thereof.

Clause 11. The invisible-fingerprint surface of any of the preceding clauses or combination of clauses, wherein the acid is present at a concentration of about 0.01% to about 10%.

Clause 12. The invisible-fingerprint surface any of the preceding clauses or combination of clauses, wherein the step of contacting is performed for at least about 5 min.

Clause 13. The invisible-fingerprint surface of any of the preceding clauses or combination of clauses, wherein the step of contacting is performed for less than about 3 hours.

Clause 14. The invisible-fingerprint surface of any of the preceding clauses or combination of clauses, wherein the step of contacting is performed for about 10 min to about 2 h.

Clause 15. The invisible-fingerprint surface of any of the preceding clauses or combination of clauses, wherein the step of contacting is performed for about 10 min to about 1 h.

Clause 16. The invisible-fingerprint surface of any of the preceding clauses or combination of clauses, wherein the step of contacting is performed for about 10 min to about 30 min.

Clause 17. The invisible-fingerprint surface of any of the preceding clauses or combination of clauses, wherein the step of contacting further includes a dialkyl siloxane.

Clause 18. The invisible-fingerprint surface of clause 17, wherein the dialkyl siloxane is capped with a trialkoxy silane.

Clause 19. The invisible-fingerprint surface of clause 17 or 18, wherein the dialkyl siloxane is formed by contacting a vinyl-terminated dialkyl siloxane with a compound of formula $(R^cO)_3SiH$, where $R^c$ is an alkyl group, in the presence of a catalyst.

Clause 20. The invisible-fingerprint surface of anyone of clause 19, wherein the catalyst comprises platinum.

Clause 21. The invisible-fingerprint surface of clause 19 or 20, wherein $R^c$ is methyl, ethyl, or propyl.

Clause 22. The invisible-fingerprint surface of anyone of clauses 17-21, wherein the dialkyl siloxane has a molecular weight of at least 3,000 Da.

Clause 23. The invisible-fingerprint surface of anyone of clauses 17-22, wherein the dialkyl siloxane comprises polydimethyl siloxane (PDMS).

Clause 24. The invisible-fingerprint surface of the preceding clauses or combination of clauses, wherein the low molecular weight alkyl silane hydrolysate does not include a fluoro.

Clause 25. The invisible-fingerprint surface of the preceding clauses or combination of clauses, wherein the formulation does not include an acid.

Clause 26. The invisible-fingerprint surface of clause 25, wherein the acid is a mineral acid.

Clause 27. The invisible-fingerprint surface of clause 26, wherein the mineral acid is hydrochloric acid, nitric acid, sulfuric acid, or a mixture thereof.

Clause 28. The invisible-fingerprint surface of any of the preceding clauses or combination of clauses, wherein the step of contacting is performed in a solvent.

Clause 29. The invisible-fingerprint surface of clause 28, wherein the solvent is a blend of an organic solvent and an alcohol.

Clause 30. The invisible-fingerprint surface of clause 29, wherein the organic solvent is a chlorinated solvent.

Clause 31. The invisible-fingerprint surface of clause 30, wherein the chlorinated solvent is chloroform or dichloromethane.

Clause 32. The invisible-fingerprint surface of anyone of clauses 29-31, wherein the alcohol is an alkyl alcohol.

Clause 33. The invisible-fingerprint surface of clause 32, wherein the alkyl alcohol is methanol, ethanol, propanol, butanol, or pentanol.

Clause 34. The invisible-fingerprint surface of clause 33, wherein the propanol is isopropanol or n-propanol.

Clause 35. The invisible-fingerprint surface of any one of clauses 29-35, wherein the blend is about 5:1 organic solvent:alcohol to about 15:1 organic solvent:alcohol.

Clause 36. The invisible-fingerprint surface of any one of clauses 29-35, wherein the blend is about 7:1 organic solvent:alcohol to about 12:1 organic solvent:alcohol.

Clause 37. The invisible-fingerprint surface of any one of clauses 29-35, wherein the blend is about 8:1 organic solvent:alcohol or about 10:1 organic solvent:alcohol.

Clause 38. The invisible-fingerprint surface of clause 1, wherein the step of applying comprises chemical vapor deposition (CVD) or physical vapor deposition (PVD) of the formulation.

Clause 39. The invisible-fingerprint surface of any of the preceding clauses or combination of clauses, wherein the formulation is a liquid formulation and the step of applying comprises spraying the liquid formulation onto the surface.

Clause 40. The invisible-fingerprint surface any of the preceding clauses or combination of clauses, wherein the invisible-fingerprint surface has an initial oil angle using diiodomethane of less than about 45° and an initial water angle of greater than about 65°.

Clause 41. The invisible-fingerprint surface of any of the preceding clauses or combination of clauses, wherein the substrate is comprises at least one material selected from the group consisting of glass, metal oxide, and acrylic polymer.

Clause 42. The invisible-fingerprint surface of any of the preceding clauses or combination of clauses, wherein the invisible-fingerprint surface has a thickness in a range of about 5 nm to about 300 nm.

Clause 43. The invisible-fingerprint surface of any of the preceding clauses or combination of clauses, wherein the invisible-fingerprint surface has an initial oil angle using diiodomethane of less than about 50°.

Clause 44. The invisible-fingerprint surface of any of the preceding clauses or combination of clauses, wherein the invisible-fingerprint surface has an initial oil angle of less than about 45°.

Clause 45. The invisible-fingerprint surface of any of the preceding clauses or combination of clauses, wherein the invisible-fingerprint surface has an initial oil angle of less than about 35°.

Clause 46. The invisible-fingerprint surface of any of the preceding clauses or combination of clauses, wherein the invisible-fingerprint surface has an initial water angle of greater than about 65°.

Clause 47. The invisible-fingerprint surface of any of the preceding clauses or combination of clauses, wherein the invisible-fingerprint surface has an initial water angle of about 70° to about 90°.

Clause 48. The invisible-fingerprint surface of any of the preceding clauses or combination of clauses, wherein the invisible-fingerprint surface is substantially free of fluoride.

Clause 49. The invisible-fingerprint surface of any of the preceding clauses or combination of clauses, wherein the invisible-fingerprint surface has an initial water angle of about 70° to about 90°.

Clause 50. The invisible-fingerprint surface of any of the preceding clauses or combination of clauses, wherein the invisible-fingerprint surface has a coefficient of friction less than about 0.15.

Clause 51. The invisible-fingerprint surface of any of the preceding clauses or combination of clauses, wherein the invisible-fingerprint surface has a coefficient of friction less than about 0.13.

Clause 52. The invisible-fingerprint surface of any of the preceding clauses or combination of clauses, wherein the invisible-fingerprint surface has a coefficient of friction of about 0.05 to about 0.13.

Clause 53. A formulation for an invisible-fingerprint coating, the formulation comprising a low molecular weight alkyl silane hydrolysate and a solvent.

Clause 54. The formulation of clause 53, wherein the low molecular weight alkyl silane hydrolysate is formed from an alkyl silane of the formula $$(R^A)_3SiR^B,$$

wherein each $R^A$ is independently —$OC_1$-$C_6$ alkyl, —$OC_1$-$C_6$ alkenyl, or —$OC_1$-$C_6$ alkynyl; and $R^B$ is $C_1$-$C_{20}$ alkyl, $C_2$-$C_{20}$ alkenyl, or $C_2$-$C_{20}$ alkynyl; wherein each hydrogen atom in $OC_1$-$C_6$ alkyl, —$OC_1$-$C_6$ alkenyl, —$OC_1$-$C_6$ alkynyl; $C_1$-$C_{20}$ alkyl, $C_2$-$C_{20}$ alkenyl, or $C_2$-$C_{20}$ alkynyl is independently optionally substituted with deuterium, halogen, —OH, —CN, —$OR^1$, —$OC_1$-$C_6$ alkyl, —$CO_2H$, $C(O)OC_1$-$C_6$ alkyl, —$C(O)NH_2$, $C(O)NH(C_1$-$C_6$ alkyl), —$C(O)N(C_1$-$C_6$ alkyl)$_2$, $SC_1$-$C_6$ alkyl, $S(O)C_1$-$C_6$ alkyl, —$S(O)_2C_1$-$C_6$ alkyl, —$S(O)NH(C_1$-$C_6$ alkyl), —$S(O)_2NH(C_1$-$C_6$ alkyl), —$S(O)N(C_1C_6$ alkyl)$_2$, —$S(O)_2N(C_1$-$C_6$ alkyl)$_2$, —$NH_2$, $NH(C_1$-$C_6$ alkyl), —$N(H)C_1$-$C_6$ alkyl-$NH_2$, —$N(H)C_1$-$C_6$ alkyl-Si(—$OC_1$-$C_6$ alkyl)$_3$, —N(R$^1$)C$_1$-C$_6$ alkyl-N(R$^1$)C$_1$-C$_6$ alkyl-Si(—OC$_1$-C$_6$ alkyl)$_3$-N(H)C$_1$-C$_6$ alkyl-N(H) C$_1$-C$_6$ alkyl-NH$_2$, —P(C$_1$-C$_6$ alkyl)$_2$, —P(O)(C$_1$-C$_6$ alkyl)$_2$, —PO$_3$H$_2$, or —Si(—OC$_1$-C$_6$ alkyl)$_3$; and wherein R$^1$ is independently deuterium, C$_1$-C$_6$ alkyl, C$_2$-C$_6$ alkenyl, C$_2$-C$_6$ alkynyl, C$_3$-C$_6$ cycloalkyl, or —C$_1$-C$_6$ alkyl-O—C$_1$-C$_6$ alkyl, wherein each hydrogen atom in C$_1$-C$_6$ alkyl is optionally substituted with hydroxy.

Clause 55. The formulation of clause 54, wherein R$^A$ is —OC$_1$-C$_6$ alkyl.

Clause 56. The formulation of clause 54 or 55, wherein R$^B$ is C$_6$-C$_{20}$ alkyl.

Clause 57. The formulation of any one of or combination of clauses 54-56, wherein R$^B$ is C$_6$-C$_{20}$ alkyl and each hydrogen atom in C$_6$-C$_{20}$ alkyl is independently optionally substituted by halogen, —OH, —CN, —OR$^1$, —CO$_2$H, —NH$_2$, NH(C$_1$-C$_6$ alkyl), —N(C$_1$-C$_6$ alkyl)$_2$, —P(C$_1$-C$_6$ alkyl)$_2$, —P(O)(C$_1$-C$_6$ alkyl)$_2$, —PO$_3$H$_2$, wherein R$^1$ is independently deuterium or —C$_1$-C$_6$alkyl-O—C$_1$-C$_6$ alkyl.

Clause 58. The formulation of any one of or combination of clauses 54-57, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane, (11-undecylinicacid)(triethoxy)silane, (hydroxyheptyl)(triethoxy)silane, (11-phosphoundecyl)(triethoxy)silane.

Clause 59. The formulation of any one of or combination of clauses 54-58, wherein the alkyl silane is 11-chloroundecyltriethoxysilane.

Clause 60. The formulation of any one of or combination of clauses 53-59, wherein the low molecular weight alkyl silane hydrolysate comprises a dialkyl siloxane.

Clause 61. The formulation of clause 60, wherein the dialkyl siloxane comprises polydimethyl siloxane (PDMS).

Clause 62. The formulation of any one of or combination of clauses 53-61, wherein the formulation does not include an acid.

Clause 63. The formulation of clause 62, wherein the acid is a mineral acid.

Clause 64. The formulation of clause 63, wherein the mineral acid is hydrochloric acid, nitric acid, sulfuric acid, or a mixture thereof.

Clause 65. A process for forming an invisible-fingerprint coating on a substrate, the process comprising
applying a formulation for an invisible-fingerprint coating to a surface of the substrate, and
curing the formulation for an invisible-fingerprint coating on the surface of the substrate to form the invisible-fingerprint coating.

Clause 66. The process of clause 65, wherein the formulation for an invisible-fingerprint coating comprises a low molecular weight alkyl silane hydrolysate.

Clause 67. The process of clause 65 or 66, wherein the low molecular weight alkyl silane hydrolysate it prepared by contacting an alkyl silane with an acid.

Clause 68. The process of clause 67, wherein the alkyl silane is of the formula $$(R^A)_3SiR^B,$$

wherein each R$^A$ is independently —OC$_1$-C$_6$ alkyl, —OC$_2$-C$_6$ alkenyl, or —OC$_2$-C$_6$ alkynyl; and R$^B$ is C$_1$-C$_{20}$ alkyl, C$_2$-C$_{20}$ alkenyl, or C$_2$-C$_{20}$ alkynyl; wherein each hydrogen atom in OC$_1$-C$_6$ alkyl, —OC$_1$-C$_6$ alkenyl, —OC$_1$-C$_6$ alkynyl; C$_1$-C$_{20}$ alkyl, C$_2$-C$_{20}$ alkenyl, or C$_2$-C$_{20}$ alkynyl is independently optionally substituted with deuterium, halogen, —OH, —CN, —OR$^1$, —CO$_2$H, —C(O)OC$_1$-C$_6$ alkyl, —C(O)NH$_2$, C(O)NH(C$_1$-C$_6$ alkyl), —C(O)N(C$_1$-C$_6$ alkyl)$_2$, SC$_1$-C$_6$ alkyl, —S(O)C$_1$-C$_6$ alkyl, —S(O)$_2$C$_1$-C$_6$ alkyl, —S(O)NH(C$_1$-C$_6$ alkyl), —S(O)$_2$NH(C$_1$-C$_6$ alkyl), S(O)N(C$_1$C$_6$ alkyl)$_2$, —S(O)$_2$N(C$_1$-C$_6$ alkyl)$_2$, —NH$_2$, NH(C$_1$-C$_6$ alkyl), —N(H)C$_1$-C$_6$ alkyl-NH$_2$, —N(H)C$_1$-C$_6$ alkyl-Si(—OC$_1$-C$_6$ alkyl)$_3$, —N(R$^1$)C$_1$-C$_6$ alkyl-N(R$^1$)C$_1$-C$_6$ alkyl-Si(—OC$_1$-C$_6$ alkyl)$_3$-N(H)C$_1$-C$_6$ alkyl-N(H) C$_1$-C$_6$ alkyl-NH$_2$, —P(C$_1$-C$_6$ alkyl)$_2$, —P(O)(C$_1$-C$_6$ alkyl)$_2$, —PO$_3$H$_2$, or —Si(—OC$_1$-C$_6$ alkyl)$_3$; and wherein R$^1$ is independently deuterium, C$_1$-C$_6$ alkyl, C$_2$-C$_6$ alkenyl, C$_2$-C$_6$ alkynyl, C$_3$-C$_6$ cycloalkyl, or —C$_1$-C$_6$ alkyl-O—C$_1$-C$_6$ alkyl, wherein each hydrogen atom in C$_1$-C$_6$ alkyl is optionally substituted with hydroxy.

Clause 69. The process of any one of or combination of clauses 65-68, wherein the invisible-fingerprint coating has an initial oil angle of at least less than about 50°.

Clause 70. The process of any one of or combination of clauses 65-69, wherein the invisible-fingerprint coating has an initial oil angle of at least less than about 45°.

Clause 71. The process of any one of or combination of clauses 65-70, wherein the invisible-fingerprint coating has an initial water angle of greater than about 65°.

Clause 72. The process of any one of or combination of clauses 65-71, wherein the invisible-fingerprint coating has an initial water angle of about 70° to about 90°.

Clause 73. The process of any one of or combination of clauses 65-72, comprising activating the surface of the substrate by exposing the surface to a plasma of at least one gas selected from the group consisting of inert gases, N$_2$, O$_2$, and a mixture of at least two of the foregoing gases.

Clause 74. The process of any one of or combination of clauses 65-73, wherein the step of applying is performed by chemical vapor deposition (CVD), physical vapor deposition (PVD), dipping, wiping, or spraying the formulation for an invisible-fingerprint coating onto the surface of the substrate.

Clause 75. The process of any one of or combination of clauses 65-74, wherein the formulation does not include an acid.

Clause 76. The process of clause 75, wherein the acid is a mineral acid.

Clause 77. The process of clause 76, wherein the mineral acid is hydrochloric acid, nitric acid, sulfuric acid, or a mixture thereof.

Clause 78. A process for forming a hydrolysate, the process comprising
contacting an alkyl silane of the formula $$(R^A)_3SiR^B,$$

wherein each R$^A$ is independently —OC$_1$-C$_6$ alkyl, —OC$_2$-C$_6$ alkenyl, or —OC$_2$-C$_6$ alkynyl; and R$^B$ is C$_1$-C$_{20}$ alkyl, C$_2$-C$_{20}$ alkenyl, or C$_2$-C$_{20}$ alkynyl; wherein each hydrogen atom in OC$_1$-C$_6$ alkyl, —OC$_1$-C$_6$ alkenyl, —OC$_1$-C$_6$ alkynyl; C$_1$-C$_{20}$ alkyl, C$_2$-C$_{20}$ alkenyl, or C$_2$-C$_{20}$ alkynyl is independently optionally substituted with deuterium, halogen, —OH, —CN, —OR$^1$, —CO$_2$H, —C(O)OC$_1$-C$_6$ alkyl, —C(O)NH$_2$, C(O)NH(C$_1$-C$_6$ alkyl), —C(O)N(C$_1$-C$_6$ alkyl)$_2$, SC$_1$-C$_6$ alkyl, —S(O)C$_1$-C$_6$ alkyl, —S(O)$_2$C$_1$-C$_6$ alkyl, —S(O)NH(C$_1$-C$_6$ alkyl), —S(O)$_2$NH(C$_1$-C$_6$ alkyl), S(O)N(C$_1$C$_6$ alkyl)$_2$, —S(O)$_2$N(C$_1$-C$_6$ alkyl)$_2$, —NH$_2$, NH(C$_1$-C$_6$ alkyl), —N(H)C$_1$-C$_6$ alkyl-NH$_2$, —N(H)C$_1$-C$_6$ alkyl-Si(—OC$_1$-C$_6$ alkyl)$_3$, —N(R$^1$)C$_1$-C$_6$ alkyl-N (R$^1$)C$_1$-C$_6$ alkyl-Si(—OC$_1$-C$_6$ alkyl)$_3$-N(H)C$_1$-C$_6$ alkyl-N(H) C$_1$-C$_6$ alkyl-NH$_2$, —P(C$_1$-C$_6$ alkyl)$_2$, —P(O)(C$_1$-C$_6$ alkyl)$_2$, —PO$_3$H$_2$, or —Si(—OC$_1$-C$_6$ alkyl)$_3$; and wherein R$^1$ is independently deuterium, C$_1$-C$_6$ alkyl, C$_2$-C$_6$ alkenyl, C$_2$-C$_6$ alkynyl, C$_3$-C$_6$ cycloalkyl, or —C$_1$-C$_6$ alkyl-O—C$_1$-C$_6$ alkyl, wherein each hydrogen atom in C$_1$-C$_6$ alkyl is optionally substituted with hydroxy; with an acid, and quenching the step of contacting, wherein the hydrolysate comprises the alkyl silane and species having a molecular weight of about 5,000 Da.

Clause 79. The process of clause 78, wherein R$^A$ is —OC$_1$-C$_6$ alkyl.

Clause 80. The process of clause 78 or 79, wherein R$^B$ is C$_6$-C$_{20}$ alkyl.

Clause 81. The process of any one of or combination of clauses 78-80, wherein R$^B$ is C$_6$-C$_{20}$ alkyl and each hydrogen atom in C$_6$-C$_{20}$ alkyl is independently optionally substituted by halogen, —OH, —CN, —OR$^1$, —CO$_2$H, —NH$_2$, NH(C$_1$-C$_6$ alkyl), —N(C$_1$-C$_6$ alkyl)$_2$, —P(C$_1$-C$_6$ alkyl)$_2$, —P(O)(C$_1$-C$_6$ alkyl)$_2$, —PO$_3$H$_2$, wherein R$^1$ is independently deuterium or —C$_1$-C$_6$alkyl-O—C$_1$-C$_6$alkyl.

Clause 82. The process of any one of or combination of clauses 78-81, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl) (triethoxy)silane; (phosphoundecyl)(triethoxy)silane.

Clause 83. The process of any one of or combination of clauses 78-82, wherein the alkyl silane is 11-chloroundecyltriethoxysilane.

Clause 84. The process of any one of or combination of clauses 78-83, wherein the acid comprises a mineral acid.

Clause 85. The process of clause 84, wherein the mineral acid is hydrochloric acid, nitric acid, sulfuric acid, or a mixture thereof.

Clause 86. The process of any one of or combination of clauses 78-85, wherein the acid is present at a concentration of about 0.01% to about 10%.

Clause 87. The process of any one of or combination of clauses 78-86, wherein the step of contacting is performed for at least about 5 min.

Clause 88. The process of any one of or combination of clauses 78-87, wherein the step of contacting is performed for less than about 3 hours.

Clause 89. The process of any one of or combination of clauses 78-88, wherein the step of contacting is performed for about 10 min to about 2 h.

Clause 90. The process of any one of or combination of clauses 78-88, wherein the step of contacting is performed for about 10 min to about 1 h.

Clause 91. The process of any one of or combination of clauses 78-88, wherein the step of contacting is performed for about 10 min to about 30 min.

Clause 92. The process of clause of any one of or combination of clauses 78-91, wherein the step of contacting further includes a dialkyl siloxane.

Clause 93. The invisible-fingerprint surface of clause 92, wherein the dialkyl siloxane is capped with a trialkoxy silane.

Clause 94. The process of clause 92 or 93, wherein the dialkyl siloxane is formed by contacting a vinyl-terminated dialkyl siloxane with a compound of formula (R$^c$O)$_3$SiH, where R$^c$ is an alkyl group, in the presence of a catalyst.

Clause 95. The invisible-fingerprint surface of clause 94, wherein the catalyst comprises platinum.

Clause 96. The invisible-fingerprint surface of clause 93 or 94, wherein R$^c$ is methyl, ethyl, or propyl.

Clause 97. The invisible-fingerprint surface of any one of or combination of clauses 92-96, wherein the dialkyl siloxane has a molecular weight of at least 3,000 Da.

Clause 98. The invisible-fingerprint surface of any one of or combination of clauses 92-97, wherein the dialkyl siloxane comprises polydimethyl siloxane (PDMS).

Clause 99. A process for forming an invisible-fingerprint coating on a substrate, the process comprising applying by physical vapor deposition a formulation for an invisible-fingerprint coating to a surface of the substrate, and curing the formulation for an invisible-fingerprint coating on the surface of the substrate to form the invisible-fingerprint coating.

Clause 100. The process of clause 99, wherein the formulation for an invisible-fingerprint coating comprises a low molecular weight alkyl silane hydrolysate.

Clause 101. The process of clause 99 or 100, wherein the formulation does not include an acid.

Clause 102. The process of any one of or combination of clauses 99-101, further comprising a step of cleaning the surface of the substrate.

Clause 103. The process of clause 102, wherein the step of cleaning occurs before the step of applying.

Clause 104. The process of any one of or combination of clauses 99-103, wherein the formulation is in the form of a pellet.

Clause 105. The process of clause 99, wherein the process comprises the step of forming the pellet.

Clause 106. The process of clause 105, wherein the step of forming the pellet includes contacting a steel wool or a copper foam with the formulation for an invisible-fingerprint coating.

Clause 107. The process of any one of or combination of clauses 99-106, wherein the step of applying is performed by thermal evaporation.

The following numbered second set of clauses include embodiments that are contemplated and non-limiting:

Clause 1. An article, comprising:
a substrate; and
an invisible-fingerprint coating deposited on the substrate, the invisible-fingerprint coating comprising a non-fluorinated alkyl silane hydrolysate polymer having a weight average molecular weight of less than 100,000 Da.

Clause 2. An article, comprising:
a substrate; and
an invisible-fingerprint coating deposited on the substrate, the invisible-fingerprint coating comprising a non-fluorinated alkyl silane hydrolysate polymer,
wherein the invisible-fingerprint coating as a thickness of less than 1000 nm and greater than 0.1 nm.

Clause 3. An article as in any preceding clause, wherein the invisible-fingerprint coating comprises a surface having an initial oil angle using diiodomethane of less than about 50° and/or an initial water angle of greater than about 65°.

Clause 4. An article as in any preceding clause, wherein the substrate comprises a material selected from the group consisting of glass, a glass ceramic, wood, a metal, a metal oxide, or a polymer.

Clause 5. An article as in any preceding clause, wherein the invisible-fingerprint coating has a thickness in a range of about 0.1 nm to about 1000 nm.

Clause 6. An article as in any preceding clause, wherein the invisible-fingerprint coating has a coefficient of friction less than about 0.15.

Clause 7. An article as in any preceding clause, wherein the invisible-fingerprint coating is able to maintain a water contact angle of at least 50 degrees after 1500 cycles of eraser abrasion.

Clause 8. An article as in any preceding clause, wherein the non-fluorinated alkyl silane hydrolysate polymer is formed from an alkyl silane having a structure as in:

$$(R^A)_3SiR^B$$

wherein:
each $R^A$ is independently —$OC_1$-$C_{10}$ alkyl, —$OC_6$-$C_{10}$ alkylaryl, —$OC_2$-$C_{10}$ alkenyl, or —$OC_3$-$C_{10}$ alkynyl;
each $R^B$ is $C_1$-$C_{20}$ alkyl, $C_6$-$C_{20}$ alkylaryl, $C_2$-$C_{20}$ alkenyl, or $C_2$-$C_{20}$ alkynyl;
each hydrogen atom in —$OC_1$-$C_{10}$ alkyl, —$OC_6$-$C_{10}$ alkylaryl, —$OC_2$-$C_{10}$ alkenyl, —$OC_3$-$C_{10}$ alkynyl, $C_1$-$C_{20}$ alkyl, $C_6$-$C_{20}$ alkylaryl, $C_2$-$C_{20}$ alkenyl, or $C_2$-$C_{20}$ alkynyl is independently optionally substituted with deuterium, halogen, —OH, —CN, —$OR^1$, —$CO_2H$, $C(O)OR^1$, —$C(O)NH_2$, —$C(O)NH(C_1$-$C_6$ alkyl), —$C(O)N(C_1$-$C_6$ alkyl)$_2$, $SC_1$-$C_6$ alkyl, $S(O)C_1$-$C_6$ alkyl, —$S(O)_2C_1$-$C_6$ alkyl, —$S(O)NH(C_1$-$C_6$ alkyl), —$S(O)_2NH(C_1$-$C_6$ alkyl), $S(O)N(C_1C_6$ alkyl)$_2$, —$S(O)_2N(C_1$-$C_6$ alkyl)$_2$, —$NH_2$, $NH(C_1$-$C_6$ alkyl), —$N(H)C_1$-$C_6$ alkyl-$NH_2$, —$N(H)C_1$-$C_6$ alkyl-Si(—$OC_1$-$C_6$ alkyl)$_3$, —$N(R^1)C_1$-$C_6$ alkyl-$N(R^1)C_1$-$C_6$ alkyl-Si(—$OC_1$-$C_6$ alkyl)$_3$-$N(H)C_1$-$C_6$ alkyl-$N(H)C_1$-$C_6$ alkyl-$NH_2$, —$P(C_1$-$C_6$ alkyl)$_2$, —$P(O)(C_1$-$C_6$ alkyl)$_2$, —$PO_3H_2$, or —$Si(-OC_1$-$C_6$ alkyl)$_3$; and
each $R^1$ is independently deuterium, $C_1$-$C_{10}$ alkyl, $C_1$-$C_{10}$ alkylaryl, $C_2$-$C_{10}$ alkenyl, $C_2$-$C_{10}$ alkynyl, $C_3$-$C_6$ cycloalkyl, $C_3$-$C_6$ cycloalkylaryl, or —$C_1$-$C_{10}$ alkyl-O—$C_1$-$C_{10}$ alkyl;
$C_1$-$C_{10}$ alkylaryl-O—$C_1$-$C_{10}$ alkylaryl wherein each hydrogen atom in $C_1$-$C_{10}$ alkyl, $C_1$-$C_{10}$ alkylaryl is optionally substituted with hydroxyl.

Clause 9. An article as in any preceding clause, wherein $R^A$ is —$OC_1$-$C_{10}$ alkyl.

Clause 10. An article as in any preceding clause, wherein $R^B$ is $C_6$-$C_{20}$ alkyl.

Clause 11. An article as in any preceding clause, wherein $R^B$ is $C_6$-$C_{20}$ alkyl and each hydrogen atom in $C_6$-$C_{20}$ alkyl is independently optionally substituted by halogen, —OH, —CN, —$OR^1$, —$CO_2H$, —$NH_2$, $NH(C_1$-$C_6$ alkyl), —$N(C_1$-$C_6$ alkyl)$_2$, —$P(C_1$-$C_6$ alkyl)$_2$, —$P(O)(C_1$-$C_6$ alkyl)$_2$, —$PO_3H_2$, wherein $R^1$ is independently deuterium or —$C_1$-$C_{10}$alkyl-O—$C_1$-$C_{10}$alkyl.

Clause 12. An article as in any preceding clause, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl) (triethoxy)silane; (phosphoundecyl)(triethoxy)silane.

Clause 13. An article as in any preceding clause, wherein the alkyl silane is 11-chloroundecyltriethoxysilane.

Clause 14. An article as in any preceding clause, wherein the invisible-fingerprint coating further comprises a cross-linking silane selected from the group consisting of formulas (I)-(IV):

$$(SiX_n)-Y^1 \quad (I)$$

$$(SiX_n)-Y^2-(SiX_n) \quad (II)$$

$$(SiX_n)-Y^3-(SiX_n)-(SiX_n), \text{ and} \quad (III)$$

$$(SiX_n)-(SiX_n)-Y^4-(SiX_n)-(SiX_n) \quad (IV)$$

wherein:
$Y^1$ is a ($C_2$-$C_{30}$) linear, branched or cyclo alkyl, aryl alkyl, alkyl aryl and each silicon in the formula (I) is bonded to the same or different carbon in atom $Y^1$;
$Y^2$ is a ($C_2$-$C_{30}$) linear, branched or cyclo alkyl, aryl alkyl, alkyl aryl and each silicon in the formula (II) is bonded to the same or different carbon in atom $Y^2$;
$Y^3$ is a ($C_2$-$C_{30}$) linear, branched or cyclo alkyl, aryl alkyl, alkyl aryl and each silicon in the formula (III) is bonded to the same or different carbon in atom $Y^3$;
$Y^4$ is a ($C_2$-$C_{30}$) linear, branched or cyclo alkyl, aryl alkyl, alkyl aryl and each silicon in the formula (IV) is bonded to the same or different carbon in atom $Y^4$;
each X is independently a monovalent leaving group selected from halogen, ($C_1$-$C_6$) alkoxy, ($C_2$-$C_6$) carboxy, and ($C_1$-$C_6$) oximo, ($C_1$-$C_6$) aryl alkoxy; and
n is an integer greater than or equal to 1 and less than or equal to 3.

Clause 15. An invisible-fingerprint composition, comprising:
a solvent; and
a non-fluorinated alkyl silane hydrolysate polymer having a weight average molecular weight of less than 100,000 Da.

Clause 16. An invisible-fingerprint composition as in clause 15, wherein the non-fluorinated alkyl silane hydrolysate polymer is present in the solvent at a concentration of at least 0.01 mg/L and less than 100 g/L.

Clause 17. An invisible-fingerprint composition as in any preceding clause, wherein the solvent comprises water, an alcohol, or a mixture thereof.

Clause 18. An invisible-fingerprint composition as in any preceding clause, wherein the alcohol is a $C_1$-$C_{10}$ alkyl-OH.

Clause 19. An invisible-fingerprint composition as in any preceding clause, wherein the invisible-fingerprint composition is free of an acid.

Clause 20. An invisible-fingerprint composition as in any preceding clause, wherein the non-fluorinated alkyl silane hydrolysate polymer is formed from an alkyl silane having a structure as in:

$$(R^A)_3SiR^B$$

each $R^A$ is independently —$OC_1$-$C_{10}$ alkyl, —$OC_6$-$C_{10}$ alkylaryl, —$OC_2$-$C_{10}$ alkenyl, or —$OC_3$-$C_{10}$ alkynyl;
each $R^B$ is $C_1$-$C_{20}$ alkyl, $C_6$-$C_{20}$ alkylaryl, $C_2$-$C_{20}$ alkenyl, or $C_2$-$C_{20}$ alkynyl;
each hydrogen atom in —$OC_1$-$C_{10}$ alkyl, —$OC_6$-$C_{10}$ alkylaryl, —$OC_2$-$C_{10}$ alkenyl, —$OC_3$-$C_{10}$ alkynyl, $C_1$-$C_{20}$ alkyl, $C_6$-$C_{20}$ alkylaryl, $C_2$-$C_{20}$ alkenyl, or $C_2$-$C_{20}$ alkynyl is independently optionally substituted with deuterium, halogen, —OH, —CN, —$OR^1$, —$CO_2H$, $C(O)OR^1$, —$C(O)NH_2$, —$C(O)NH(C_1$-$C_6$ alkyl), —$C(O)N(C_1$-$C_6$ alkyl)$_2$, $SC_1$-$C_6$ alkyl, $S(O)C_1$-$C_6$ alkyl, —$S(O)_2C_1$-$C_6$ alkyl, —$S(O)NH(C_1$-$C_6$ alkyl), —$S(O)_2NH(C_1$-$C_6$ alkyl), $S(O)N(C_1C_6$ alkyl)$_2$, —$S(O)_2N(C_1$-$C_6$ alkyl)$_2$, —$NH_2$, $NH(C_1$-$C_6$ alkyl), —N(H)C$_1$-C$_6$ alkyl-NH$_2$, —N(H)C$_1$-C$_6$ alkyl-Si(—OC$_1$-C$_6$ alkyl)$_3$, —N(R$^1$)C$_1$-C$_6$ alkyl-N(R$^1$)C$_1$-C$_6$ alkyl-Si(—OC$_1$-C$_6$ alkyl)$_3$-N(H)C$_1$-C$_6$ alkyl-N(H)C$_1$-C$_6$ alkyl-NH$_2$, —P(C$_1$-C$_6$ alkyl)$_2$, —P(O)(C$_1$-C$_6$ alkyl)$_2$, —PO$_3$H$_2$, or —Si(—OC$_1$-C$_6$ alkyl)$_3$; and each R$^1$ is independently deuterium, C$_1$-C$_{10}$ alkyl, C$_1$-C$_{10}$ alkylaryl, C$_2$-C$_{10}$ alkenyl, C$_2$-C$_{10}$ alkynyl, C$_3$-C$_6$ cycloalkyl, C$_3$-C$_6$ cycloalkylaryl, or —C$_1$-C$_{10}$alkyl-O—C$_1$-C$_{10}$alkyl;

C$_1$-C$_{10}$ alkylaryl-O—C$_1$-C$_{10}$ alkylaryl wherein each hydrogen atom in C$_1$-C$_{10}$ alkyl, C$_1$-C$_{10}$ alkylaryl is optionally substituted with hydroxyl.

Clause 21. An invisible-fingerprint composition as in any preceding clause, wherein R$^A$ is —OC$_1$-C$_{10}$ alkyl.

Clause 22. An invisible-fingerprint composition as in any preceding clause, wherein R$^B$ is C$_6$-C$_{20}$ alkyl.

Clause 23. An invisible-fingerprint composition as in any preceding clause, wherein R$^B$ is C$_6$-C$_{20}$ alkyl and each hydrogen atom in C$_6$-C$_{20}$ alkyl is independently optionally substituted by halogen, —OH, —CN, —OR$^1$, —CO$_2$H, —NH$_2$, NH(C$_1$-C$_6$ alkyl), —N(C$_1$-C$_6$ alkyl)$_2$, —P(C$_1$-C$_6$ alkyl)$_2$, —P(O)(C$_1$-C$_6$ alkyl)$_2$, —PO$_3$H$_2$, wherein R$^1$ is independently deuterium or —C$_1$-C$_6$alkyl-O—C$_1$-C$_6$alkyl.

Clause 24. An invisible-fingerprint composition as in any preceding clause, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl) (triethoxy)silane; (phosphoundecyl)(triethoxy)silane.

Clause 25. An invisible-fingerprint composition as in any preceding clause, wherein the alkyl silane is 11-chloroundecyltriethoxysilane.

Clause 26. An invisible-fingerprint composition as in any preceding clause, wherein the invisible-fingerprint coating further comprises a crosslinking silane selected from the group consisting of formulas (I)-(IV):

$$(SiX_n)-Y^1 \quad (I)$$

$$(SiX_n)-Y^2-(SiX_n) \quad (II)$$

$$(SiX_n)-Y^3-(SiX_n)-(SiX_n), \text{ and} \quad (III)$$

$$(SiX_n)-(SiX_n)-Y^4-(SiX_n)-(SiX_n) \quad (IV)$$

wherein:
Y$^1$ is a (C$_2$-C$_{30}$) linear, branched or cyclo alkyl, aryl alkyl, alkyl aryl and each silicon in the formula (I) is bonded to the same or different carbon in atom Y$^1$;

Y$^2$ is a (C$_2$-C$_{30}$) linear, branched or cyclo alkyl, aryl alkyl, alkyl aryl and each silicon in the formula (II) is bonded to the same or different carbon in atom Y$^2$;

Y$^3$ is a (C$_2$-C$_{30}$) linear, branched or cyclo alkyl, aryl alkyl, alkyl aryl and each silicon in the formula (III) is bonded to the same or different carbon in atom Y$^3$;

Y$^4$ is a (C2-C30) linear, branched or cyclo alkyl, aryl alkyl, alkyl aryl and each silicon in the formula (IV) is bonded to the same or different carbon in atom Y$^4$;

each X is independently a monovalent leaving group selected from halogen, (C$_1$-C$_6$) alkoxy, (C$_2$-C$_6$) carboxy, and (C$_1$-C$_6$) oximo, (C$_1$-C$_6$) aryl alkoxy; and n is an integer greater than or equal to 1 and less than or equal to 3.

Clause 27. An invisible-fingerprint composition as in any preceding clause, wherein the non-fluorinated alkyl silane hydrolysate polymer has a weight average molecular weight of greater than or equal to 300 Da.

Clause 28. A method for forming an invisible-fingerprint composition, comprising:
polymerizing, in a first solvent comprising water and an alcohol, an alkyl silane to form a non-fluorinated alkyl silane hydrolysate; and
dissolving the non-fluorinated alkyl silane hydrolysate in a second solvent to a concentration of at least 0.01 mg/L and less than 100 g/L.

Clause 29. A method as in clause 28, wherein the ratio of water to the alcohol in the first solvent is 1:1000 to 1000:1.

Clause 30. A method as in any preceding clause, wherein the polymerizing step is performed a temperature of about −10° C. up to reflux of the first solvent.

Clause 31. A method as in any preceding clause, wherein the alkyl silane has a structure as in $$(R^A)_3SiR^B$$

each R$^A$ is independently —OC$_1$-C$_{10}$ alkyl, —OC$_6$-C$_{10}$ alkylaryl, —OC$_2$-C$_{10}$ alkenyl, or —OC$_3$-C$_{10}$ alkynyl;

each R$^B$ is C$_1$-C$_{20}$ alkyl, C$_6$-C$_{20}$ alkylaryl, C$_2$-C$_{20}$ alkenyl, or C$_2$-C$_{20}$ alkynyl;

each hydrogen atom in —OC$_1$-C$_{10}$ alkyl, —OC$_6$-C$_{10}$ alkylaryl, —OC$_2$-C$_{10}$ alkenyl, —OC$_3$-C$_{10}$ alkynyl, C$_1$-C$_{20}$ alkyl, C$_6$-C$_{20}$ alkylaryl, C$_2$-C$_{20}$ alkenyl, or C$_2$-C$_{20}$ alkynyl is independently optionally substituted with deuterium, halogen, —OH, —CN, —OR$^1$, —CO$_2$H, C(O)OR$^1$, —C(O)NH$_2$, —C(O)NH(C$_1$-C$_6$ alkyl), —C(O)N(C$_1$-C$_6$ alkyl)$_2$, SC$_1$-C$_6$ alkyl, S(O)C$_1$-C$_6$ alkyl, —S(O)$_2$C$_1$-C$_6$ alkyl, —S(O)NH(C$_1$-C$_6$ alkyl), —S(O)$_2$NH(C$_1$-C$_6$ alkyl), S(O)N(C$_1$C$_6$ alkyl)$_2$, —S(O)$_2$N(C$_1$-C$_6$ alkyl)$_2$, —NH$_2$, NH(C$_1$-C$_6$ alkyl), —N(H)C$_1$-C$_6$ alkyl-NH$_2$, —N(H)C$_1$-C$_6$ alkyl-Si(—OC$_1$-C$_6$ alkyl)$_3$, —N(R$^1$)C$_1$-C$_6$ alkyl-N(R$^1$)C$_1$-C$_6$ alkyl-Si(—OC$_1$-C$_6$ alkyl)$_3$-N(H)C$_1$-C$_6$ alkyl-N(H)C$_1$-C$_6$ alkyl-NH$_2$, —P(C$_1$-C$_6$ alkyl)$_2$, —P(O)(C$_1$-C$_6$ alkyl)$_2$, —PO$_3$H$_2$, or —Si(—OC$_1$-C$_6$ alkyl)$_3$; and each R$^1$ is independently deuterium, C$_1$-C$_{10}$ alkyl, C$_1$-C$_{10}$ alkylaryl, C$_2$-C$_{10}$ alkenyl, C$_2$-C$_{10}$ alkynyl, C$_3$-C$_6$ cycloalkyl, C$_3$-C$_6$ cycloalkylaryl, or —C$_1$-C$_{10}$alkyl-O—C$_1$-C$_{10}$alkyl;

C$_1$-C$_{10}$ alkylaryl-O—C$_1$-C$_{10}$ alkylaryl wherein each hydrogen atom in C$_1$-C$_{10}$ alkyl, C$_1$-C$_{10}$ alkylaryl is optionally substituted with hydroxyl.

Clause 32. A method as in any preceding clause, wherein R$^A$ is —OC$_1$-C$_6$ alkyl.

Clause 33. A method as in any preceding clause, wherein R$^B$ is C$_6$-C$_{20}$ alkyl.

Clause 34. A method as in any preceding clause, wherein R$^B$ is C$_6$-C$_{20}$ alkyl and each hydrogen atom in C$_6$-C$_{20}$ alkyl is independently optionally substituted by halogen, —OH, —CN, —OR$^1$, —CO$_2$H, —NH$_2$, NH(C$_1$-C$_6$ alkyl), —N(C$_1$-C$_6$ alkyl)$_2$, —P(C$_1$-C$_6$ alkyl)$_2$, —P(O)(C$_1$-C$_6$ alkyl)$_2$, —PO$_3$H$_2$, wherein R$^1$ is independently deuterium or —C$_1$-C$_6$alkyl-O—C$_1$-C$_6$alkyl.

Clause 35. A method as in any preceding clause, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl) (triethoxy)silane; (phosphoundecyl)(triethoxy)silane.

Clause 36. A method as in any preceding clause, wherein the alkyl silane comprises 11-chloroundecyltriethoxysilane.

Clause 37. A method as in any preceding clause, wherein a ratio of the water to the alcohol present in the first solvent is between 1:1000 to 1000:1.

Clause 38. A method as in any preceding clause, wherein the alcohol comprises ethanol.

Clause 39. A method as in any preceding clause, wherein the first solvent has a pH of between 0 and 14.

Clause 40. A method as in any preceding clause, wherein the first solvent has a pH of between 6 and 8.

Clause 41. A method as in any preceding clause, wherein the second solvent comprises water, an alcohol, or a mixture thereof.

Clause 42. A method as in any preceding clause, further comprising polymerizing the alkyl silane in the presence of a crosslinking silane, the crosslinking silane selected from the group consisting of formulas (I)-(IV):

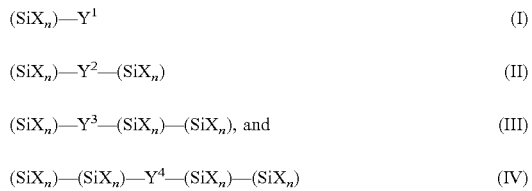

wherein:
Y$^1$ is a (C$_2$-C$_{30}$) linear, branched or cyclo alkyl, aryl alkyl, alkyl aryl and each silicon in the formula (I) is bonded to the same or different carbon in atom Y$^1$;
Y$^2$ is a (C$_2$-C$_{30}$) linear, branched or cyclo alkyl, aryl alkyl, alkyl aryl and each silicon in the formula (II) is bonded to the same or different carbon in atom Y$^2$;
Y$^3$ is a (C$_2$-C$_{30}$) linear, branched or cyclo alkyl, aryl alkyl, alkyl aryl and each silicon in the formula (III) is bonded to the same or different carbon in atom Y$^3$;
Y$^4$ is a (C$_2$-C$_{30}$) linear, branched or cyclo alkyl, aryl alkyl, alkyl aryl and each silicon in the formula (IV) is bonded to the same or different carbon in atom Y$^4$;
each X is independently a monovalent leaving group selected from halogen, (C$_1$-C$_6$) alkoxy, (C$_2$-C$_6$) carboxy, and (C$_1$-C$_6$) oximo, (C$_1$-C$_6$) aryl alkoxy; and
n is an integer greater than or equal to 1 and less than or equal to 3.

Clause 43. A method as in any preceding clause, wherein the step of polymerizing is performed for greater than or equal to 0.1 hours and less than or equal to 72 hours.

Clause 44. A method as in any preceding clause, further comprising purifying the polymerized non-fluorinated alkyl silane hydrolysate.

Clause 45. A method for forming an invisible-fingerprint surface, comprising:
depositing, on a surface of a substrate, a formulation comprising:
a solvent; and
a non-fluorinated alkyl silane hydrolysate polymer having a weight average molecular weight of less than 100,000 Da and at least 300 Da; and
curing the formulation to form the invisible-fingerprint surface.

Clause 46. A method as in clause 45, wherein the step of depositing comprises spraying, dipping, wiping, chemical vapor deposition (CVD), or physical vapor deposition (PVD).

Clause 47. A method as in any preceding clause, wherein the solvent comprises an alcohol.

Clause 48. A method as in clause 47, wherein the alcohol is a C$_1$-C$_6$ alkyl-OH.

Clause 49. A method as in any preceding clause, wherein the substrate comprises a material selected from the group consisting of glass, a glass ceramic, wood, a metal, a metal oxide, or a polymer.

Clause 50. A method as in any preceding clause, wherein curing comprises heating the formulation to a temperature of greater than or equal to 20° C. and less than or equal to 250° C.

Clause 51. A method as in any preceding clause, wherein the step of curing is performed for greater than or equal to 0.1 hours and less than or equal to 48 hours.

Clause 52. A method as in any preceding clause, wherein the step of depositing comprises forming a layer comprising the non-fluorinated alkyl silane hydrolysate polymer having a thickness of greater than or equal to 0.1 nm and less than or equal to 300 nm.

Clause 53. A method as in any preceding clause, wherein the formulation comprises the non-fluorinated alkyl silane hydrolysate polymer dissolved in the solvent in a concentration of 0.01 mg/L to 100 g/L.

Clause 54. A method as in any preceding clause, wherein, after curing, the invisible-fingerprint surface has an initial oil angle using diiodomethane of less than about 45° and an initial water angle of greater than about 65°.

Clause 55. A method as in any preceding clause, wherein, after curing, the invisible-fingerprint coating comprises a surface having an initial oil angle using diiodomethane of less than about 50° and/or an initial water angle of greater than about 65°.

Clause 56. A method as in any preceding clause, wherein, after curing, the invisible-fingerprint coating has a coefficient of friction less than about 0.15.

Clause 57. A method as in any preceding clause, wherein, after curing, the invisible-fingerprint coating is able to maintain a water contact angle of at least 50 degrees after 1500 cycles of eraser abrasion.

Clause 58. A method as in any preceding clause, wherein the non-flourinated alkyl silane hydrolysate polymer is formed from an alkyl silane having a structure as in:

(R$^A$)$_3$SiR$^B$ each R$^A$ is independently —OC$_1$-C$_{10}$ alkyl, —OC$_6$-C$_{10}$ alkylaryl, —OC$_2$-C$_{10}$ alkenyl, or —OC$_3$-C$_{10}$ alkynyl;
each R$^B$ is C$_1$-C$_{20}$ alkyl, C$_6$-C$_{20}$ alkylaryl, C$_2$-C$_{20}$ alkenyl, or C$_2$-C$_{20}$ alkynyl;
each hydrogen atom in —OC$_1$-C$_{10}$ alkyl, —OC$_6$-C$_{10}$ alkylaryl, —OC$_2$-C$_{10}$ alkenyl, —OC$_3$-C$_{10}$ alkynyl, C$_1$-C$_{20}$ alkyl, C$_6$-C$_{20}$ alkylaryl, C$_2$-C$_{20}$ alkenyl, or C$_2$-C$_{20}$ alkynyl is independently optionally substituted with deuterium, halogen, —OH, —CN, —OR$^1$, —CO$_2$H, C(O)OR$^1$, —C(O)NH$_2$, —C(O)NH(C$_1$-C$_6$ alkyl), —C(O)N(C$_1$-C$_6$ alkyl)$_2$, SC$_1$-C$_6$ alkyl, S(O)C$_1$-C$_6$ alkyl, —S(O)$_2$C$_1$-C$_6$ alkyl, —S(O)NH(C$_1$-C$_6$ alkyl), —S(O)$_2$NH(C$_1$-C$_6$ alkyl), S(O)N(C$_1$C$_6$ alkyl)$_2$, —S(O)$_2$N(C$_1$-C$_6$ alkyl)$_2$, —NH$_2$, NH(C$_1$-C$_6$ alkyl), —N(H)C$_1$-C$_6$ alkyl-NH$_2$, —N(H)C$_1$-C$_6$ alkyl-Si(—OC$_1$-C$_6$ alkyl)$_3$, —N(R$^1$)C$_1$-C$_6$ alkyl-N(R$^1$)C$_1$-C$_6$ alkyl-Si(—OC$_1$-C$_6$ alkyl)$_3$-N(H)C$_1$-C$_6$ alkyl-N(H)C$_1$-C$_6$ alkyl-NH$_2$, —P(C$_1$-C$_6$ alkyl)$_2$, —P(O)(C$_1$-C$_6$ alkyl)$_2$, —PO$_3$H$_2$, or —Si(—OC$_1$-C$_6$ alkyl)$_3$; and each $R^1$ is independently deuterium, $C_1$-$C_{10}$ alkyl, $C_1$-$C_{10}$ alkylaryl, $C_2$-$C_{10}$ alkenyl, $C_2$-$C_{10}$ alkynyl, $C_3$-$C_6$ cycloalkyl, $C_3$-$C_6$ cycloalkylaryl, or —$C_1$-$C_{10}$ alkyl-O—$C_1$-$C_{10}$ alkyl;
$C_1$-$C_{10}$ alkylaryl-O—$C_1$-$C_{10}$ alkylaryl wherein each hydrogen atom in $C_1$-$C_{10}$ alkyl, $C_1$-$C_{10}$ alkylaryl is optionally substituted with hydroxyl.

Clause 59. A method as in any preceding clause, wherein $R^A$ is —$OC_1$-$C_{10}$ alkyl.

Clause 60. A method as in any preceding clause, wherein $R^B$ is $C_6$-$C_{20}$ alkyl.

Clause 61. A method as in any preceding clause, wherein $R^B$ is $C_6$-$C_{20}$ alkyl and each hydrogen atom in $C_6$-$C_{20}$ alkyl is independently optionally substituted by halogen, —OH, —CN, —$OR^1$, —$CO_2H$, —$NH_2$, $NH(C_1$-$C_6$ alkyl), —$N(C_1$-$C_6$ alkyl)$_2$, —$P(C_1$-$C_6$ alkyl)$_2$, —$P(O)(C_1$-$C_6$ alkyl)$_2$, —$PO_3H_2$, wherein $R^1$ is independently deuterium or —$C_1$-$C_6$alkyl-O—$C_1$-$C_6$alkyl.

62. A method as in any preceding clause, wherein the alkyl silane is selected from the group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane; (undecylinic acid)(triethoxy)silane; (hydroxyundecyl)(triethoxy) silane; (hydroxyheptyl) (triethoxy)silane; (phosphoundecyl)(triethoxy)silane.

Clause 63. A method as in any preceding clause, wherein the alkyl silane is 11-chloroundecyltriethoxysilane.

Clause 64. A method as in any preceding clause, wherein the formulation further comprises a crosslinking silane selected from the group consisting of formulas (I)-(IV):

$(SiX_n)$—$Y^1$     (I)

$(SiX_n)$—$Y^2$—$(SiX_n)$     (II)

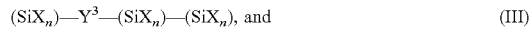

$(SiX_n)$—$Y^3$—$(SiX_n)$—$(SiX_n)$, and     (III)

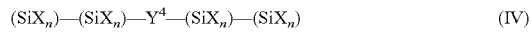

$(SiX_n)$—$(SiX_n)$—$Y^4$—$(SiX_n)$—$(SiX_n)$     (IV)

wherein:
$Y^1$ is a ($C_2$-$C_{30}$) linear, branched or cyclo alkyl, aryl alkyl, alkyl aryl and each silicon in the formula (I) is bonded to the same or different carbon in atom $Y^1$;
$Y^2$ is a ($C_2$-$C_{30}$) linear, branched or cyclo alkyl, aryl alkyl, alkyl aryl and each silicon in the formula (II) is bonded to the same or different carbon in atom $Y^2$;
$Y^3$ is a ($C_2$-$C_{30}$) linear, branched or cyclo alkyl, aryl alkyl, alkyl aryl and each silicon in the formula (III) is bonded to the same or different carbon in atom $Y^3$;
$Y^4$ is a ($C_2$-$C_{30}$) linear, branched or cyclo alkyl, aryl alkyl, alkyl aryl and each silicon in the formula (IV) is bonded to the same or different carbon in atom $Y^4$;
each X is independently a monovalent leaving group selected from halogen, ($C_1$-$C_6$) alkoxy, ($C_2$-$C_6$) carboxy, and ($C_1$-$C_6$) oximo, ($C_1$-$C_6$) aryl alkoxy; and
n is an integer greater than or equal to 1 and less than or equal to 3.

Clause 65. A method as in any preceding clause, wherein the formulation is free of an acid.

Clause 66. A method as in any preceding clause, further comprising activating the surface of the substrate by exposing the surface to a plasma of at least one gas selected from the group consisting of inert gases, $N_2$, $O_2$, and a mixture of at least two of the foregoing gases.

Clause 67. An article, composition, or method as in any preceding clause wherein the non-fluorinated alkyl silane hydrolysate polymer comprises a functional group selected from the group consisting of hydroxy, carboxy, amino, halo, and combinations thereof.

EXAMPLES

The following examples are set forth for purposes of illustration only. Parts and percentages appearing in such examples are by weight unless otherwise stipulated.

Example 1

General Procedure 10 g of 11-chloroundecyltriethoxysilane was dissolved in 90 g of dichloromethane:isopropanol (8:1). 1 mL of 3.5% aqueous $HNO_3$ was added to reaction mixture and it was stirred for up to 2 hours. Samples were taken at various times such as 30 min, 1 h, and 2 h etc. The samples taken were washed with water, dried over $Na_2SO_4$. The solvent was removed using rotary evaporator. 0.1 g of the resulting oil was dissolved in 25 mL of isopropanol and sprayed onto glass. Diiodomethane and water contact angles were measured, delta E, abrasion resistance were checked after keeping in the coated glass in the oven for 15 min at 120° C.

Example 2

Synthesis 10 g of 11-chloroundecyltriethoxysilane was dissolved in 90 g of dichloromethane:isopropanol (8:1). 1 mL of 3.5% aqueous $HNO_3$ was added to reaction mixture and the reaction was stirred. After stirring for 30 min, the reaction was stopped by washing with water. The organic phase was separated and dried over $Na_2SO_4$ and filtered. The filtrate was evaporated off using rotary evaporator. The resulting oil was taken to the next step to prepare a formulation for a coating.

Example 3

Formulation for a Coating

A formulation for a coating was prepared by dissolving the hydrolysate from Example 2 in ethanol to a concentration of about 2.75 g/l of ethanol.

Example 4

Abrasion Resistance

A low molecular weight alkyl silane hydrolysate was formed according to Example 1 where the reaction time was one hour. A formulation for a finger-print resistant coating was prepared according Example 3 and sprayed onto gorilla glass. The coating was cured for 20 minutes at 125° C. and then overnight at room temperature. The abrasion resistance was measured according to ASTM D4060. The test was performed on the specimens with an abrasive disk of CS-10 hardness under a load of 250 g on an area measuring 1.5 cm², with a translational rate of 50 cycles/minute and a rotation speed of 6 rpm. Initial contact angles for water and oil (diiodomethane) were measured. The test was performed for 1,000 or 2,000 cycles. After the cycles, contact angles for water were measured.

TABLE 1

| Initial oil (°) | Initial water (°) | Water after 1,000 cycles (°) | Water after 2,000 cycles (°) |
|---|---|---|---|
| 38 | 78 | 64 | 62 |

Example 5

Coefficient of Friction

A formulation according to Example 3 was sprayed onto gorilla glass. The coated glass was cured for one hour at 125° C. The coefficient of friction was measured by a Labthink FPT-F1 Friction/Peel tester. The resulting value was 0.108.

Example 6

Synthesis of PDMS-TEOS

Monovinyl terminated PDMS (5 k) (10 g, 0.002 mol, 1 eq; available from Gelest) and triethoxysilane (0.5 g, 0.003 mol, 1.5 eq) was dissolved in 5 ml anhydrous toluene and purged under Ar for 30 min. 0.1 mL of Pt(Dvs) (available from Sigma Aldrich) added to reaction mixture and allowed to come 90° C. The reaction mixture was stirred at 90° C. for about 60 hours. The reaction mixture was directly filtered through celite after it cools down to room temperature. Yield: 7.9 g.

Example 7

Hydrolysate with PDMS-TEOS 5 g of 11-chloroundecyltriethoxysilane and 0.5 g of PDMS-TEOS were dissolved in 55 g of dichloromethane:isopropanol (10:1). 0.5 mL of 7% aqueous $HNO_3$ was added to reaction mixture and let it stir. After 15 min, 30 min and 1 h, samples were taken from the reaction mixture and worked up by washing with water. The organic phases were separated and dried over $Na_2SO_4$ and filtered. The filtrate was evaporated off using rotary evaporator. The formulation for an invisible-fingerprint coating was prepared by dissolving the oil in ethanol to a concentration of about 2.5 g/l.

Example 8

Abrasion Resistance

A formulation according to Example 7 was sprayed onto gorilla glass. The coated glass was cured for 20 minutes at 125° C. The steps of spraying and baking were repeated three times for a total of four layers. The coated glass was allowed to cure overnight at room temperature. Initial water and oil ($CH_2I_2$) contact angles were measured. The coated glass was then abraded according to Example 4. Results are shown in Table 2.

TABLE 2

| | Contact Angles | | |
|---|---|---|---|
| Contact Angle | Initial | 1,000 Cycles | 3,000 Cycles |
| Water | 79 | 49 | 49 |
| Diiodomethane | 42 | 43 | 44 |

Example 9

Abrasion Resistance

A formulation according to Example 7 was sprayed onto gorilla glass. The coated glass was cured for 20 minutes at 125° C. The steps of spraying and baking were repeated three times for four layers. The coated glass was allowed to cure overnight at room temperature. Initial water and oil ($CH_2I_2$) contact angles were measured. The coated glass was then abraded according to Example 4. Results are shown in Table 3.

TABLE 3

| | Contact Angles | | |
|---|---|---|---|
| Contact Angle | Initial (°) | 1,000 Cycles (°) | 3,000 Cycles (°) |
| Water | 72 | 57 | 48 |
| Diiodimethane | 42 | 45 | 41 |

Example 10

Abrasion Resistance

A formulation according to Example 7 was sprayed onto gorilla glass. The coated glass was cured for 20 minutes at 125° C. The steps of spraying and baking was repeated once for a total of two layers. The coated glass was allowed to cure for 30 minutes at room temperature. Initial water and oil ($CH_2I_2$) contact angles were measured. The coated glass was then abraded according to Example 4. Results are shown in Table 4.

TABLE 4

| | Contact Angles | | |
|---|---|---|---|
| Contact Angle | Initial (°) | 1,000 Cycles (°) | 3,000 Cycles (°) |
| Water | 84 | 62 | 56 |
| Diiodimethane | 41 | 44 | 41 |

Example 11

Abrasion Resistance

A formulation according to Example 7 was sprayed onto gorilla glass. The coated glass was cured for 1 h minutes at 150° C. The steps of spraying and baking was repeated three times for a total of four layers. Initial water and oil ($CH_2I_2$) contact angles were measured prior to curing. The coated glass was allowed to cure overnight at room temperature. Initial water and oil ($CH_2I_2$) contact angles were measured. The coated glass was then abraded according to Example 4. Results are shown in Table 5.

TABLE 5

| | Contact Angles | | | |
|---|---|---|---|---|
| Contact Angle | Pre-overnight cure (°) | Initial (°) | 1,000 Cycles (°) | 3,000 Cycles (°) |
| Water | 77 | 79 | 56 | 54 |
| Diiodimethane | 48 | 47 | 42 | 43 |

Example 12

Delta E

For measuring fingerprint performance, the L A B values of the virgin glass on a black background were measured, ideally using black card-stock or a black OLED display. Then the operator must wipe their dominant hand with all four fingers 2-3 times on their nose or forehead, which are the most oily part of the body. Then they will immediately tap on the glass with all four fingers with moderate force 10 times, which will result in 40 fingerprints on the surface. Then they will use a colorimeter to measure the L A B values and will use those values to calculate the delta E based on the virgin and fingerprinted glass. The lower the delta E the more invisible the fingerprints are. Then the operator will take a piece of jean material, ideally a standardized LEVIS 401 jean material and wipe the glass twice along the same area to attempt to wipe off the fingerprints. Then the operator will calculate the delta E compared to the virgin glass to determine the cleanability of the coating. The closer the value is to 0 the more invisible the fingerprint is.

Different hydrolysate reaction times (according to Example 2) were analyzed. Formulations for an invisible-fingerprint coating were prepared according to Example 3. The invisible-fingerprint coating was formed according to Example 4. The results are shown in Table 6.

TABLE 6

Delta E values

| Time | Delta E |
|---|---|
| 30 min | 0.25 |
| 1 h | 0.3 |
| 2 h | 0.5 |
| 5 h | 0.6 |
| 1 day | >0.8 |

The following chemicals listed in Table 7 were used in the examples below.

TABLE 7

Chemicals

| Description | CAS Number | Supplier |
|---|---|---|
| 11-chloroundecyltriethoxy silane | 20876-31-5 | Gelest, Inc. |
| Ethanol, anhydrous, 200 proof (EtOH) | 64-17-5 | Acros Organics |
| Deionized Water (H$_2$O) | 7732-18-5 | In-House RODI System |
| 1,2-Bis(triethoxysilyl) ethane (BIS) | 16068-37-4 | Gelest, Inc. |
| 1,1,2-Tris(triethoxysilyl) ethane (TRIS) | 151198-82-2 | Gelest, Inc. |

Example 13

Formulation 10 g of 11-chloroundecyltriethoxy silane, 70 mL of anhydrous, 200 proof ethanol and 0.8 mL of deionized water were charge to a 100 mL round bottom flask equipped with a reflux condenser. With mixing, the solution is heated to reflux, about 79° C., and held for 20 hours. The reaction mixture is then rotary evaporated to a full vacuum at 45-55° C. to remove ethanol and water resulting in 8.3 g of polychloroundecyl siloxane.

Example 14 Through Example 16

Examples 14-16 were prepared in the same manner as Example 13, however the amount of water charged to the reaction was varied to modify the extent of hydrolysis and condensation of the polychloroundecyl siloxanes formed, as shown in Table 8.

TABLE 8

Water and 11-chloroundecyltriethoxysilane Charges and Yields for Examples 13 through 16

| Example | 11-chloroundecyl-triethoxysilane (g) | Water (mL) | Water:Ethoxy | Yield (g) |
|---|---|---|---|---|
| 13 | 10 | 0.8 | 1.0:2.0 | 8.3 |
| 14 | 10 | 1.5 | 1.0:1.0 | 7.7 |
| 15 | 10 | 3.0 | 2.0:1.0 | 7.5 |
| 16 | 10 | 4.6 | 3.0:1.0 | 7.3 |

The polychloroundecyl siloxanes generated from Examples 13-16 were analyzed using Gel Permeation Chromatography (GPC) with results shown in Table 9. The polychloroundecyl siloxanes generated using higher water to ethoxy ratios achieve higher molecular weights and polydispersity.

TABLE 9

GPC Analysis for Polychloroundecyl Siloxane Examples 13 through 16

| Example | Water:Ethoxy | Mn | Mw | Mw/Mn |
|---|---|---|---|---|
| 13 | 1.0:2.0 | 637 | 769 | 1.20744 |
| 14 | 1.0:1.0 | 796 | 994 | 1.24942 |
| 15 | 2.0:1.0 | 1078 | 1415 | 1.31207 |
| 16 | 3.0:1.0 | 1379 | 1880 | 1.36283 |

The polychloroundecyl siloxanes generated from Examples 13-16 were analyzed using Fourier Transform Infrared Spectroscopy (FTIR). An overlay of the FTIR obtained from the four examples along with the starting 11-chloroundecyltriethoxysilane (shown as "CLAS") is shown in FIG. 1. All four samples show the slight formation of a broad stretch between 3200 to 3500 cm$^{-1}$ indicating the formation of hydroxyl groups. Also, a broadening of the stretch occurring between 1100 and 1200 cm$^{-1}$ can be seen. The progressively increasing water to ethoxy ratios results in an increasingly broadening of this FTIR stretch indicating higher polychloroundecyl siloxane content.

The polychloroundecyl siloxanes generated from Examples 13-16 were analyzed using Proton Nuclear Magnetic Resonance spectroscopy (NMR). NMR "Integration Analysis" was used to determine the "extent of reaction" by comparing the "ethoxy groups" remaining after the reaction. Table 10 below lists the calculated extent of reaction for Examples 13-16. The progressively increasing water to ethoxy ratios results in a progressively increasing extent of reaction and lower amounts of unreacted starting material in the final products.

TABLE 10

NMR Integration Analysis for Polychloroundecyl
Siloxane Examples 13 through 16

| Example | Water:Ethoxy | Residual Starting Material | Extent of Reaction |
|---|---|---|---|
| 13 | 1.0:2.0 | 45.7% | 54.3% |
| 14 | 1.0:1.0 | 28.5% | 71.5% |
| 15 | 2.0:1.0 | 15.3% | 84.7% |
| 16 | 3.0:1.0 | 10.4% | 89.1% |

Example 17

Coating

The four polychloroundecyl siloxane samples from Examples 13-16 were coated onto glass panels and cured. Once cured, initial water contact angles (IWA) were measured using a using droplets of water and initial diiodomethane contact angles (IDA) were taken using the Goniometer. Once the initial angles were measured, the coatings were linearly abraded for 1500 cycles then contact angles remeasured. These same samples were abraded for an additional 1500 cycles, 3000 total, and contact angles measured again. Table 11 below list the initial and abraded contact angels for the four coated polychloroundecyl siloxane samples.

TABLE 11

Contact Angles for Glass Coated Polychloroundecyl
Siloxane Examples 13 through 16

| Example | Water:Ethoxy | TWA | IDA |
|---|---|---|---|
| 13 | 1.0:2.0 | 70.88 | 37.25 |
| 14 | 1.0:1.0 | 70.25 | 37.13 |
| 15 | 2.0:1.0 | 82.75 | 45.75 |
| 16 | 3.0:1.0 | 67.13 | 41.75 |

Example 18

Formulation 10 g of 11-chloroundecyltriethoxy silane, 0.72 g 1,2-bis (Triethoxysilyl) Ethane (BIS), 70 mL of anhydrous, 200 proof ethanol and 0.88 mL of deionized water were charge to a 100 mL round bottom flask equipped with a reflux condenser. With mixing, the solution is heated to reflux, about 79° C., and held for 20 hours. The reaction mixture is then rotary evaporated to a full vacuum at 45-55° C. to remove ethanol and water resulting in 8.8 g of polychloroundecyl siloxane.

Example 19 Through Example 21

Examples 19-21 were prepared in the same manner as Example 16, however the amount of water charged to the reaction was varied to modify the extent of hydrolysis and condensation of the polychloroundecyl siloxanes formed. Table 12 details these four examples. Example 21 was run at 2× scale.

TABLE 12

Water, 11-chloroundecyltriethoxysilane and BIS Charges
and Yields for Examples 18 through 21

| Example | 11-chloroundecyl-triethoxysilane (g) | BIS (g) | Water (mL) | Water:Ethoxy | Yield (g) |
|---|---|---|---|---|---|
| 18 | 10 | 0.72 | 0.88 | 1.0:2.0 | 8.8 |
| 19 | 10 | 0.72 | 1.75 | 1.0:1.0 | 8.3 |
| 20 | 10 | 0.72 | 3.50 | 2.0:1.0 | 7.7 |
| 21 | 20 | 144 | 10.5 | 3.0:1.0 | 15.1 |

The polychloroundecyl siloxanes generated from Examples 18-21 were analyzed using Gel Permeation Chromatography (GPC) with results shown in Table 13. The polychloroundecyl siloxanes generated using higher water to ethoxy rations achieve higher molecular weights and polydispersity.

TABLE 13

GPC Analysis for Polychloroundecyl
Siloxane Examples 18 through 21

| Example | Water:Ethoxy | Mn | Mw | Mw/Mn |
|---|---|---|---|---|
| 18 | 1.0:2.0 | 629 | 887 | 1.41054 |
| 19 | 1.0:1.0 | 778 | 1018 | 1.30848 |
| 20 | 2.0:1.0 | 1240 | 1852 | 1.49421 |
| 21 | 3.0:1.0 | 2006 | 3232 | 1.61105 |

Figure 2:
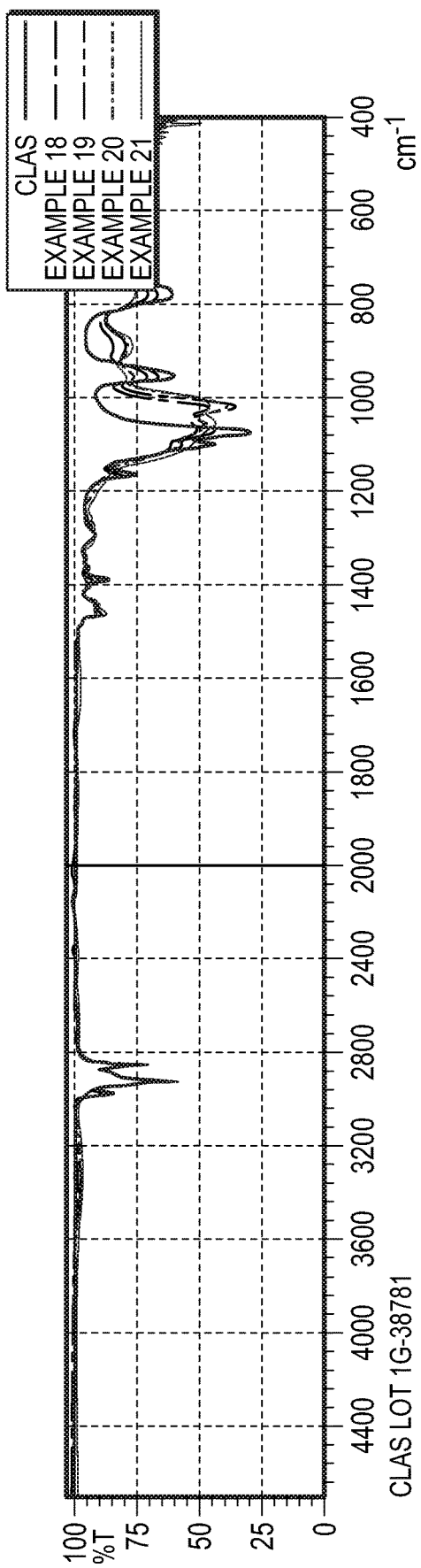
FIG. 2 shows an FTIR of Examples 18-21 and 11-chloroundecyltriethoxysilane, shown on the figure as "CLAS."

The polychloroundecyl siloxanes generated from Examples 18-21 were analyzed using Fourier Transform Infrared Spectroscopy (FTIR). An overlay of the FTIR obtained from the four examples along with the starting 11-chloroundecyltriethoxysilane (shown as "CLAS") is shown in FIG. 2. All four samples show the slight formation of a broad stretch between 3200 to 3500 cm$^{-1}$ indicating the formation of hydroxyl groups. Also, a broadening of the stretch occurring between 1100 and 1200 cm$^{-1}$ can be seen. The progressively increasing water to ethoxy ratios results in an increasingly broadening of this FTIR stretch indicating higher polychloroundecyl siloxane content.

The polychloroundecyl siloxanes generated from Examples 18-21 were analyzed using Proton Nuclear Magnetic Resonance spectroscopy (NMR). NMR "Integration Analysis" was used to determine the "extent of reaction" by comparing the "ethoxy groups" remaining after the reaction. Table 14 below lists the calculated extent of reaction for Examples 18-21. The progressively increasing water to ethoxy ratios results in a progressively increasing extent of reaction and lower amounts of unreacted starting material in the final products.

TABLE 14

NMR Integration Analysis for Polychloroundecyl
Siloxane Examples 18 through 21

| Example | Water:Ethoxy | Residual Starting Material | Extent of Reaction |
|---|---|---|---|
| 18 | 1.0:2.0 | 50.7% | 49.3% |
| 19 | 1.0:1.0 | 31.7% | 68.3% |
| 20 | 2.0:1.0 | 18.3% | 81.7% |
| 21 | 3.0:1.0 | 10.9% | 89.1% |

Example 22

Coating

The four polychloroundecyl siloxane samples from Examples 18-21 were coated onto glass panels and cured. Once cured, initial water contact angles (IWA) were measured using a using droplets of water and initial diiodomethane contact angles (IDA) were taken using the Goniometer. Once the initial angles were measure, the coatings were linearly abraded for 1500 cycles then contact angles remeasured. These same samples were abraded for an additional 1500 cycles, 3,000 total, and contact angles measured again. Table 15 below list the initial and abraded contact angels for the four coated polychloroundecyl siloxane samples.

TABLE 15

Contact Angles for Glass Coated Polychloroundecyl Siloxane Examples 18 through 21

| Example | Water:Ethoxy | TWA | IDA |
|---|---|---|---|
| 18 | 1.0:2.0 | 79.88 | 38.63 |
| 19 | 1.0:1.0 | 82.25 | 40.13 |
| 20 | 2.0:1.0 | 82.13 | 44.13 |
| 21 | 3.0:1.0 | 79.38 | 42.38 |

Example 23

Formulation 10 g of 11-chloroundecyltriethoxy silane, 1.04 g 1,2-Tris(Triethoxysilyl) Ethane (TRIS), 70 mL of anhydrous, 200 proof ethanol and 0.93 mL of deionized water were charge to a 100 mL round bottom flask equipped with a reflux condenser. With mixing, the solution is heated to reflux, about 79° C., and held for 20 hours. The reaction mixture is then rotary evaporated to a full vacuum at 45-55° C. to remove ethanol and water resulting in 9.2 g of polychloroundecyl siloxane.

Example 24 Through Example 26

Examples 24-26 were prepared in the same manner as Example 23, however the amount of water charged to the reaction was varied to modify the extent of hydrolysis and condensation of the polychloroundecyl siloxanes formed. Table 16 details these four examples. Example 26 was run at 2× scale.

TABLE 16

Water Charge and Yields for Examples 23 through 26

| Example | Water:Ethoxy | 11-chloroundecyl-triethoxysilane (g) | TRIS (g) | Water (mL) | Yield (g) |
|---|---|---|---|---|---|
| 23 | 1.0:2.0 | 10 | 1.04 | 0.93 | 9.2 |
| 24 | 1.0:1.0 | 10 | 1.04 | 1.85 | 8.2 |
| 25 | 2.0:1.0 | 10 | 1.04 | 3.70 | 8.2 |
| 26 | 3.0:1.0 | 20 | 2.08 | 11.0 | 15.7 |

The polychloroundecyl siloxanes generated from Examples 23-26 were analyzed using Gel Permeation Chromatography (GPC) with results shown in Table 17. The polychloroundecyl siloxanes generated using higher water to ethoxy rations achieve higher molecular weights and polydispersity.

TABLE 17

GPC Analysis for Polychloroundecyl Siloxane Examples 23-26

| Example | Water:Ethoxy | Mn | Mw | Mw/Mn |
|---|---|---|---|---|
| 23 | 1.0:2.0 | 587 | 781 | 1.33157 |
| 24 | 1.0:1.0 | 808 | 1146 | 1.41877 |
| 25 | 2.0:1.0 | 1344 | 2186 | 1.62586 |
| 26 | 3.0:1.0 | 1776 | 3001 | 1.68967 |

Figure 3:
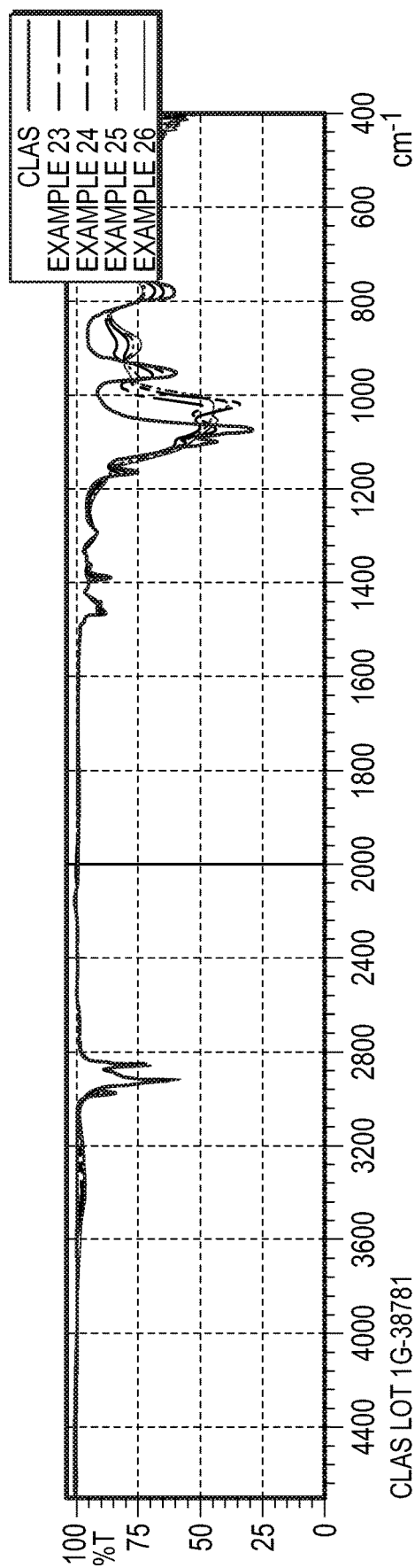
FIG. 3 shows an FTIR of Examples 23-26 and 11-chloroundecyltriethoxysilane, shown on the figure as "CLAS."

The polychloroundecyl siloxanes generated from Examples 23-26 were analyzed using Fourier Transform Infrared Spectroscopy (FTIR). An overlay of the FTIR obtained from the four examples along with the starting 11-chloroundecyltriethoxysilane (shown as "CLAS") is shown in FIG. 3. All four samples show the slight formation of a broad stretch between 3200 to 3500 $cm^{-1}$ indicating the formation of hydroxyl groups. Also, a broadening of the stretch occurring between 1100 and 1200 $cm^{-1}$ can be seen. The progressively increasing water to ethoxy ratios results in an increasingly broadening of this FTIR stretch indicating higher polychloroundecyl siloxane content.

The polychloroundecyl siloxanes generated from Examples 23-26 were analyzed using Proton Nuclear Magnetic Resonance spectroscopy (NMR). NMR "Integration Analysis" was used to determine the "extent of reaction" by comparing the "ethoxy groups" remaining after the reaction. Table 18 below lists the calculated extent of reaction for Examples 21-24. The progressively increasing water to ethoxy ratios results in a progressively increasing extent of reaction and lower amounts of unreacted starting material in the final products.

TABLE 18

NMR Integration Analysis for Polychloroundecyl Siloxane Examples 23-26

| Example | Water:Ethoxy | Residual Starting Material | Extent of Reaction |
|---|---|---|---|
| 23 | 1.0:2.0 | 54.3% | 45.7% |
| 24 | 1.0:1.0 | 34.4% | 65.6% |
| 25 | 2.0:1.0 | 18.7% | 81.3% |
| 26 | 3.0:1.0 | 33.0% | 67.0% |

The four polychloroundecyl siloxane samples from Examples 23-26 were coated onto glass panels and cured. Once cured, initial water contact angles (IWA) were measured using a using droplets of water and initial diiodomethane contact angles (IDA) were taken using the Goniometer. Once the initial angles were measure, the coatings were linearly abraded for 1,500 cycles then contact angles remeasured. These same samples were abraded for an additional 1500 cycles, 3,000 total, and contact angles measured again. Table 19 below list the initial and abraded contact angels for the four coated polychloroundecyl siloxane samples.

TABLE 19

Contact Angles for Glass Coated Polychloroundecyl Siloxane Examples 23-26

| Example | Water:Ethoxy | TWA | IDA |
|---|---|---|---|
| 23 | 1.0:2.0 | 76.13 | 44.00 |
| 24 | 1.0:1.0 | 82.13 | 36.50 |

TABLE 19-continued

Contact Angles for Glass Coated Polychloroundecyl Siloxane Examples 23-26

| Example | Water:Ethoxy | TWA | IDA |
|---|---|---|---|
| 25 | 2.0:1.0 | 83.50 | 46.38 |
| 26 | 3.0:1.0 | 78.88 | 46.50 |

Example 27

Thermo Gravimetric Analysis

Thermogravimetric analysis (TGA) was performed on a thermogravimetric analyzer Discovery Series by TA instruments. Samples were heated in a platinum pan from room temperature to 700° C. at a heating rate of 20° C./min under a nitrogen purge (25 mL/min).

Figure 4:
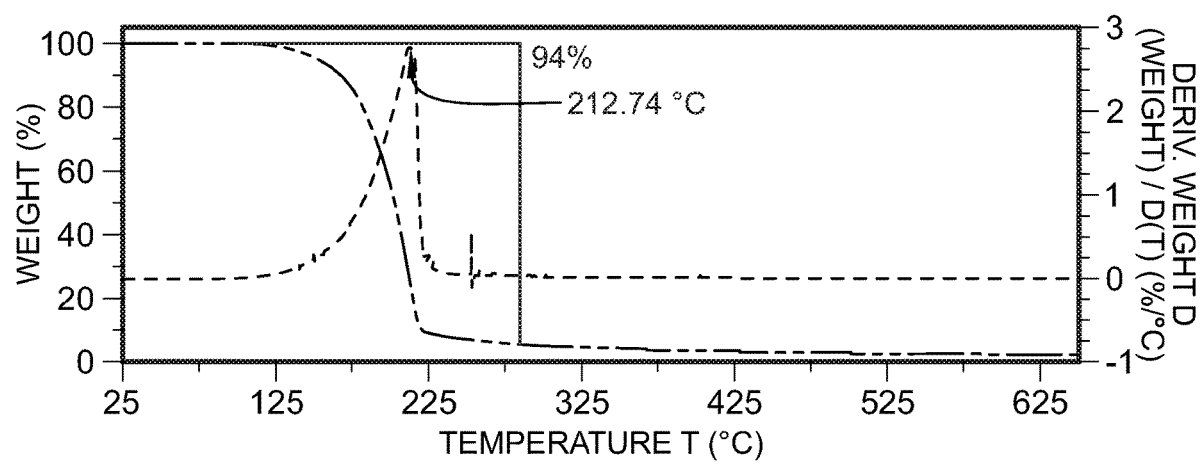
FIG. 4 shows a TGA of 11-chloroundecyltriethoxysilane.

The TGA data for 11-Chloroundecyltriethoxysilane is shown in FIG. 4.

To understand the polymerization of the formulations described herein, water to ethoxy ratios were varied for the following reagent mixtures: pure 11-chloroundecyltriethoxysilane, 14:1 11-chloroundecyltriethoxysilane to 1,2-bis(triethoxysilyl)ethane, 14:1 11-chloroundecyltriethoxysilane to 1,1,2-tris(triethoxysilyl)ethane. For each sample set, four experiments were performed using the following water to ethoxy ratios: 1.0:2.0, 1.0:1.0, 2.0:1.0, and 3.0:1.0. Reaction temperature, time, and pH were all controlled.

Figure 5:
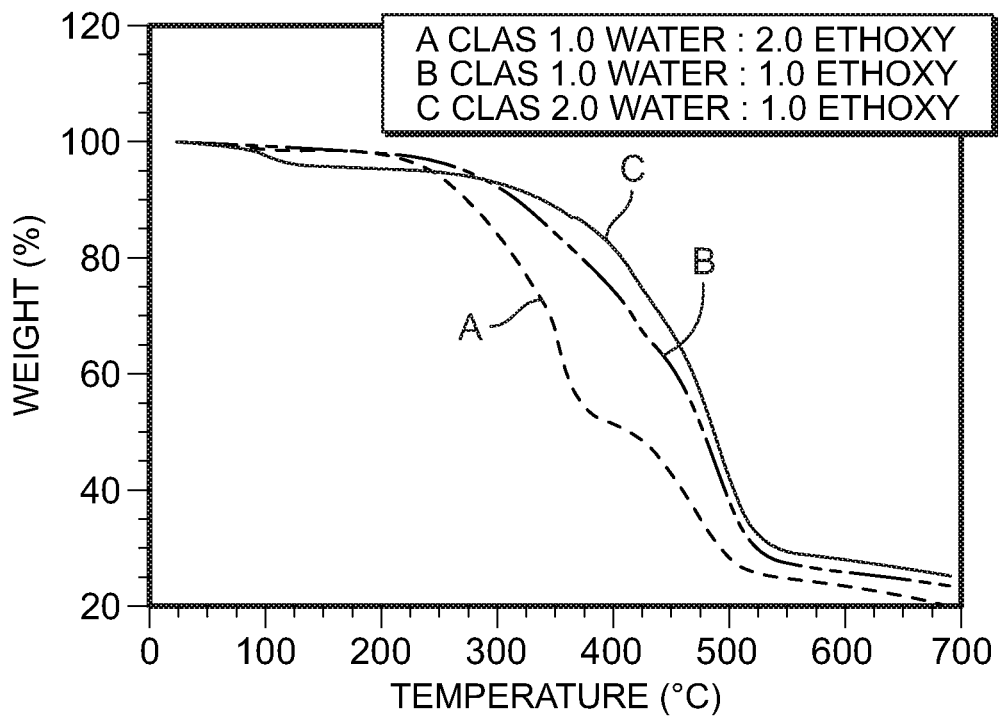
FIG. 5 shows a TGA of weight loss vs. temperature of 11-chloroundecyltriethoxysilane, shown on the figure as "CLAS," with the following water to ethoxy molar ratios: 1:2 (A); 1:1 (B); and 2:1 (C).
Figure 6:
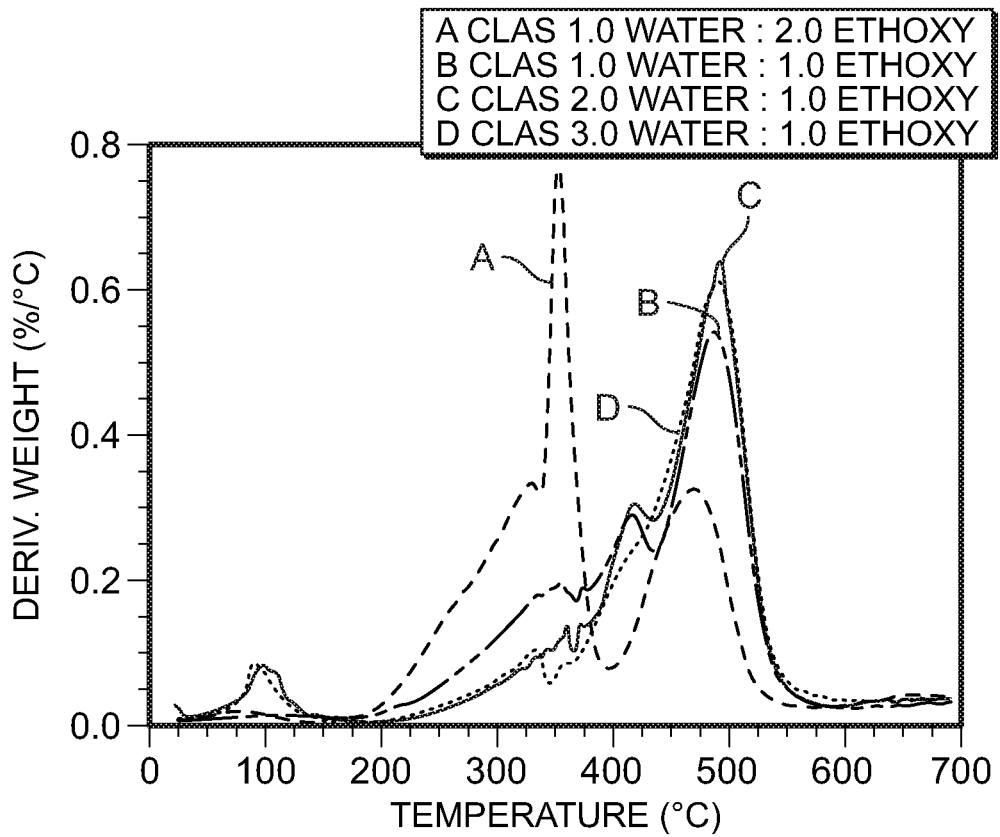
FIG. 6 shows derivative weight loss vs temperature of polymerized 11-chloroundecyltriethoxysilane shown on the figure as "CLAS," the following water to ethoxy molar ratios: 1:1 (A); 2:1 (B); and 3:1 (C).

Higher molecular weight may manifest itself in TGA as the weight loss shifting towards the right (higher temperature) in the weight loss vs temperature graph or as the peak in the derivative weight loss occurring at a higher temperature. For siloxanes, a second weight loss step may also be observed at 500° C. where Si—O—Si linkages degrade. This weight loss step is especially apparent in the derivative weight loss vs temperature. Experiments varying water to ethoxy ratio in pure 11-chloroundecyltriethoxysilane are shown in FIGS. 5 and 6.

The reaction parameters are held constant while increasing the amount of water equivalents present in reaction. By incorporating more water in the reaction, more hydrolysis may occur which may lead to increased concentration of silanol bonds which increases degree of polymerization.

The TGA data suggests that samples with more water content have increased onset of degradation temperature and a higher derivative weight loss peak at 500° C. was observed. This may be due to more —Si—O—Si— bonds formed from polymerization. These bonds have a thermal degradation temperature of about 500° C.

The two samples with the highest water content showed a weight loss at 100° C. This is likely due to residual water remaining in the sample or additional condensation of silanol end groups. The samples with the highest water content during reaction was present which forms a higher concentration of Si—OH bonds.

From the TGA data, it is observed that samples with more water content have increased onset of degradation temperature and a higher derivative weight loss peak at 500° C. was observed. This is due to more —Si—O—Si— bonds formed from polymerization. These bonds have a thermal degradation temperature of about 500° C.

Interestingly in the two samples with the highest water content, a significant weight loss is observed at 100° C. This is likely due to residual water remaining in the sample or additional condensation of silanol end groups. The samples with the highest water content during reaction was present which forms a higher concentration of Si—OH bonds.

Figure 7:
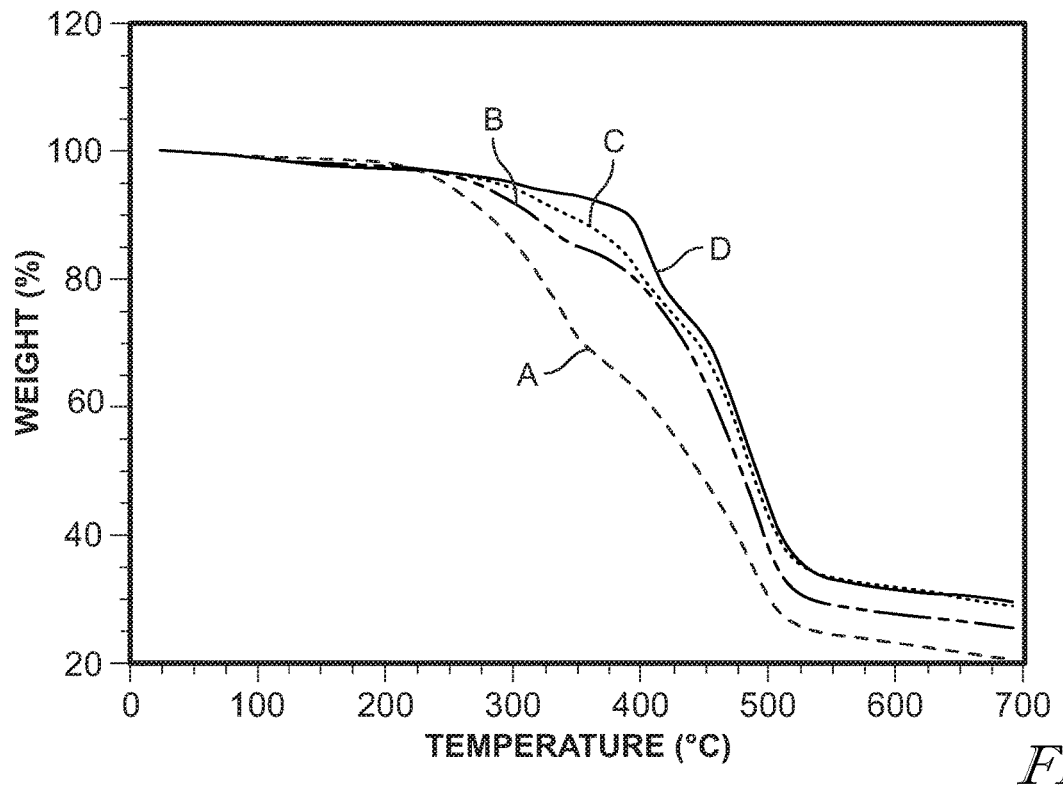
FIG. 7 shows weight loss vs. temperature of 11-chloroundecyltriethoxysilane with 1,2-bis(triethoxysilyl) ethane at a 14:1 ratio with the following water to ethoxy molar ratios: 1:2 (A); 1:1 (B); 2:1 (C); and 3:1 (D).
Figure 8:
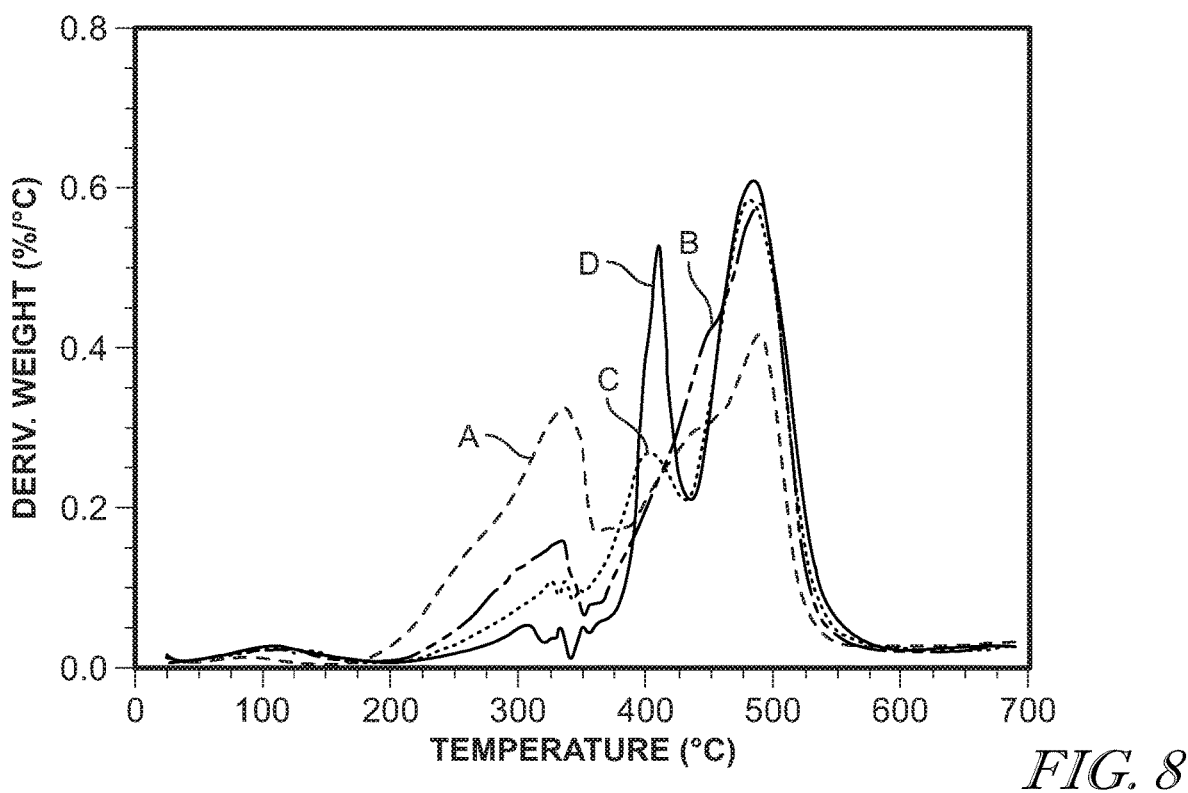
FIG. 8 shows weight loss vs. temperature of 11-chloroundecyltriethoxysilane with 1,2-bis(triethoxysilyl)ethane at a 14:1 ratio with the following water to ethoxy molar ratios: 1:2 (A); 1:1 (B); 2:1 (C); and 3:1 (D).

Experiments varying water to ethoxy ratio in a mixture of 11-chloroundecyltriethoxysilane and 1,2-bis(triethoxysilyl)ethane (BIS) (14:1) are shown in FIGS. 7 and 8. Similar trends are observed as in the pure 11-chloroundecyltriethoxysilane experiment where onset of degradation temperature increases (shift right) and the magnitude of the derivative weight loss peak at 500° C. increases with more water.

Figure 9:
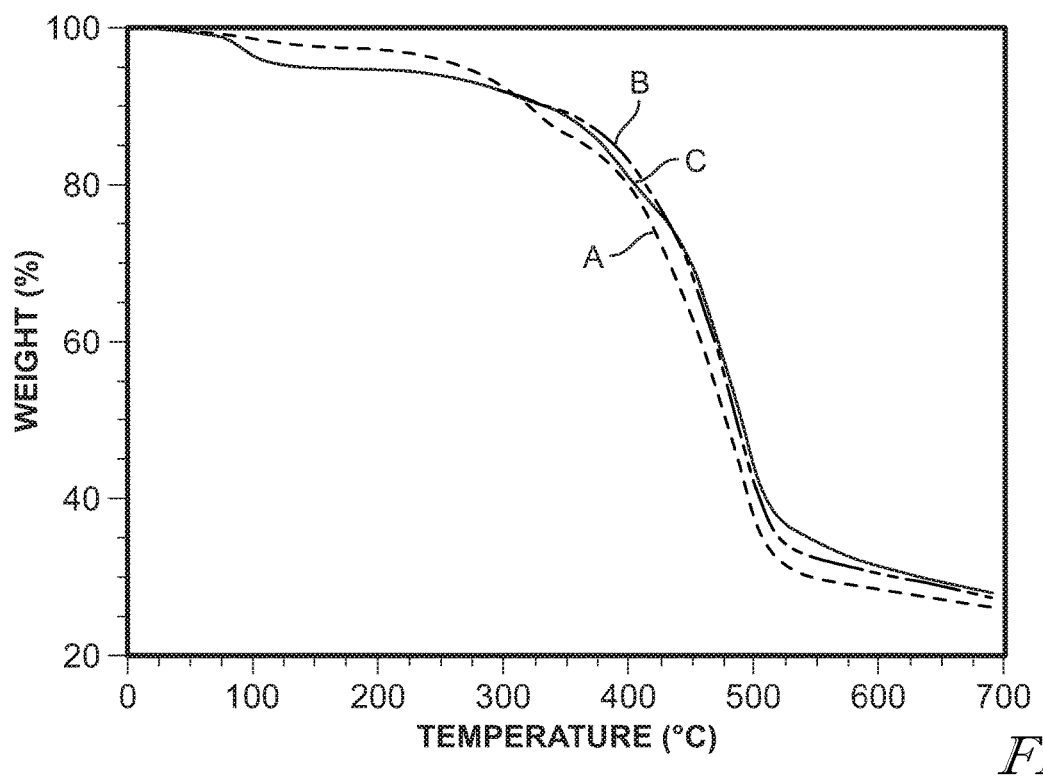
FIG. 9 shows weight loss vs. temperature of 11-chloroundecyltriethoxysilane with 1,1,2-tris(triethoxysilyl)ethane at a 14:1 ratio with the following water to ethoxy molar ratios: 1:1 (A); 2:1 (B); and 3:1 (C).
Figure 10:
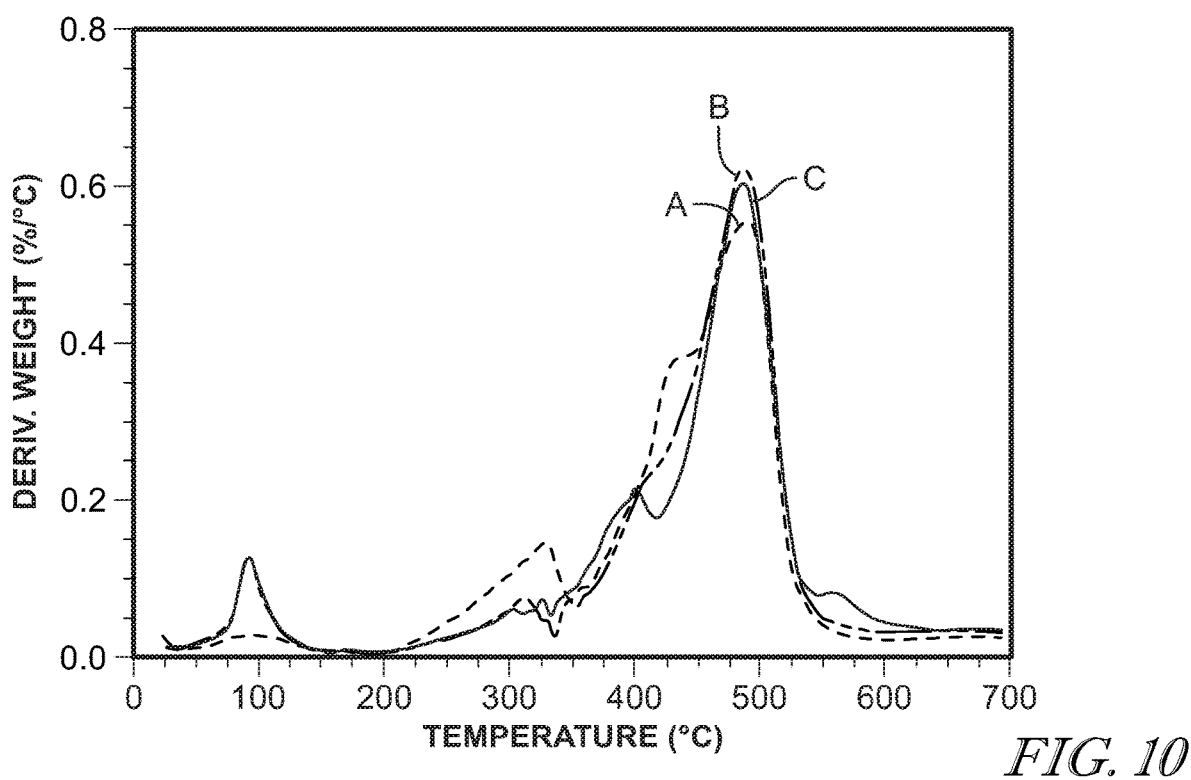
FIG. 10 shows derivative weight loss vs. temperature of 11-chloroundecyltriethoxysilane with 1,1,2-tris(triethoxysilyl)ethane at a 14:1 ratio with the following water to ethoxy molar ratios: 1:1 (A); 2:1 (B); and 3:1 (C).

Experiments varying water to ethoxy ratio in a mixture of 11-chloroundecyltriethoxysilane and 1,1,2-tris(triethoxysilyl)ethane (TRIS) (14:1) are shown in FIGS. 9 and 10. Similar trends are observed as in the pure 11-chloroundecyltriethoxysilane and 11-chloroundecyltriethoxysilane+BIS 14:1 ratio experiment where onset of degradation temperature increases (shift right) and the magnitude of the derivative weight loss peak at 500° C. increases with more water, albeit at a lower degree.

The shift in degradation temperature is much smaller in all 11-chloroundecyltriethoxysilane and TRIS samples compared to the previous two sample sets. This may suggest that the reaction of 11-chloroundecyltriethoxysilane, TRIS and water may occur faster than 11-chloroundecyltriethoxysilane alone or 11-chloroundecyltriethoxysilane and BIS combined. Notably, for 11-chloroundecyltriethoxysilane and TRIS reactions, at water to ethoxy ratios higher than 2:1 a significant degradation peak is observed at 100° C. This may indicate the presence of water due to incomplete solvent and water removal at the end of the process or it may be due to unreacted silanol groups continuing to condensed releasing water into the final IFP hydrolysate. The magnitude in the 500° C. degradation peak does not show a clear increasing trend in comparison to 11-chloroundecyltriethoxysilane alone and 11-chloroundecyltriethoxysilane plus BIS. This may suggest that the water to ethoxy ratios studied may be far past the saturation point of the hydrolysis/condensation reaction of silanols/siloxanes.

From each sample set with varied water to ethoxy ratios, the TGA data suggests that increasing water to increase hydrolysis within the reaction may further lead to a higher degree of polymerization from condensation.

Example 28

Gel Permeation Chromatography (GPC)

Figure 11:
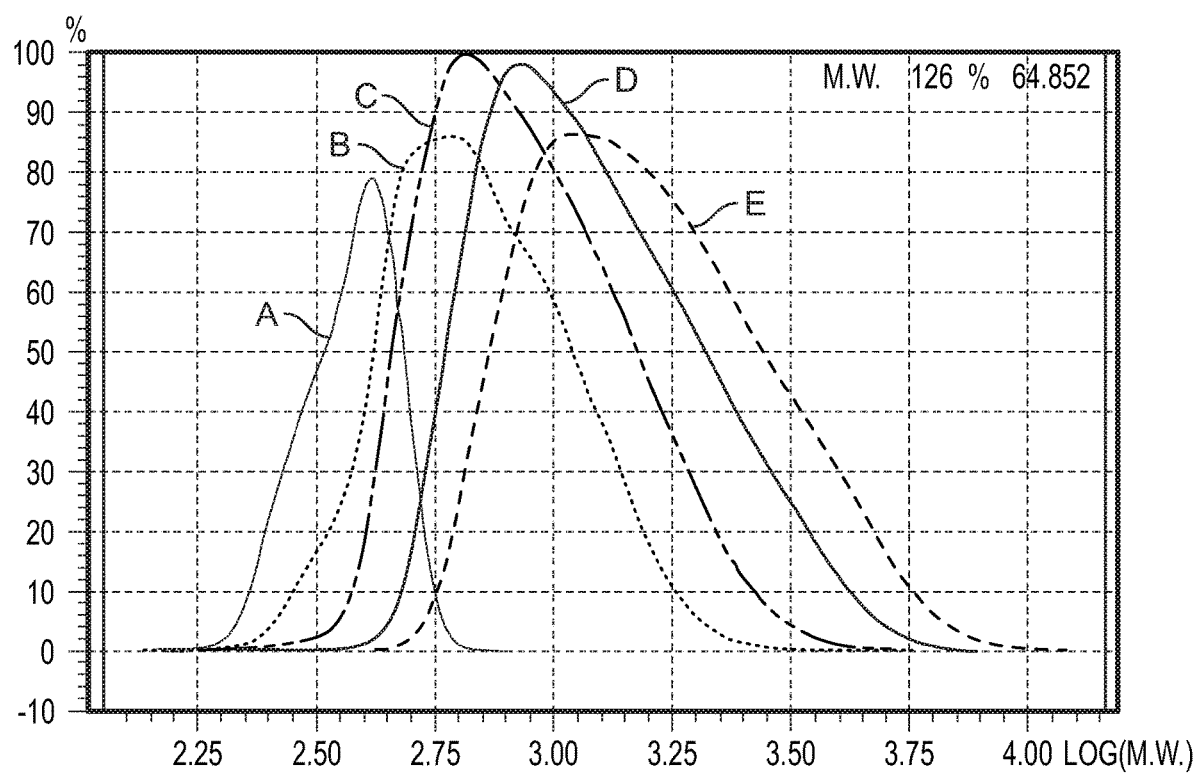
FIG. 11 shows a GPC chromatogram of a unreacted 11-chloroundecyltriethoxysilane (A) formed hydrolysate of 11-chloroundecyltriethoxysilane with the following water to ethoxy molar ratios: 1:2 (B), 1:1 (C), 2:1 (D); and 3:1 (E).

A Shimadzu Prominence-I LC-2030C Plus GPC was used to determine the molecular weight of the IFP Hydrolysate. FIG. 11 shows an overlay of molecular weights of 11-chloroundecyltriethoxysilane starting material along with four different IFP hydrolysates. These IFP Hydrolysates were made from the same 11-chloroundecyltriethoxysilane starting material but using four different water to alkoxy ratios, 1:2, 1:1, 2:1 and 3:1 water:alkoxy. The results are shown in FIG. 11. As the water levels increase, the final molecular weight increases as noted by the shift to the right of the molecular weight distributions.

At a water to ethoxy ratio greater or equal to 3:1, over 87% of the starting material may be converted into an oligomer or polymer.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. An article, comprising:
   a substrate comprising a glass, a glass ceramic, wood, a metal, a metal oxide, or a polymer; and
   an invisible-fingerprint coating deposited on the substrate, the invisible-fingerprint coating comprising an alkyl silane hydrolysate polymer having a weight average molecular weight of less than 100,000 Da;
   wherein the alkyl silane hydrolysate polymer is formed from:
   (i) an alkyl silane having a structure: $(R^4)_3SiR^B$
      wherein:
         each $R^4$ is independently —$OC_1$-$C_{10}$ alkyl, —$OC_6$-$C_{10}$ alkylaryl, —$OC_2$-$C_{10}$ alkenyl, or —$OC_3$-$C_{10}$ alkynyl; and
         $R^B$ is $C_6$-$C_{20}$ alkyl; and
   (ii) a crosslinking silane selected from the group consisting of formulas (II)-(IV):
      (II) $(SiX_n)$—$Y^2$—$(SiX_n)$,
      (III) $(SiX_n)$—$Y^3$—$(SiX_n)$—$(SiX_n)$, and
      (IV) $(SiX_n)$—$(SiX_n)$—$Y^4$—$(SiX_n)$—$(SiX_n)$
      wherein:
         $Y^2$ is a ($C_2$-$C_{30}$) linear, branched or cyclo alkyl, aryl alkyl, alkyl aryl and each silicon in the formula (II) is bonded to the same or different carbon atom in $Y^2$;
         $Y^3$ is a ($C_2$-$C_{30}$) linear, branched or cyclo alkyl, aryl alkyl, alkyl aryl and each silicon in the formula the formula (III) is bonded to the same or different carbon atom in $Y^3$;
         $Y^4$ is a ($C_2$-$C_{30}$) linear, branched or cyclo alkyl, aryl alkyl, alkyl aryl and each silicon in the formula (IV) is bonded to the same or different carbon atom $Y^4$;
         each X is independently a ($C_1$-$C_6$)alkoxy; and
         each n is 3; and
   wherein the alkyl silane hydrolysate polymer comprises a halogen-substituted alkyl, with the proviso that the halogen of the halogen-substituted alkyl is chlorine, bromine, or iodine.

2. The article of claim 1, wherein the invisible-fingerprint coating comprises a surface having an initial oil contact angle using diiodomethane of less than about 45°, an initial water contact angle of greater than about 70°, or both an initial oil contact angle using diiodomethane of less than about 45° and an initial water contact angle of greater than about 70°.

3. The article of claim 1, wherein $R^B$ is substituted by halogen, —OH, —CN, —$OR^1$, —$CO_2H$, —$NH_2$, $NH(C_1$-$C_6$ alkyl), —$N(C_1$-$C_6$ alkyl)$_2$, —$P(C_1$-$C_6$ alkyl)$_2$, —$P(O)(C_1$-$C_6$ alkyl)$_2$, or —$PO_3H_2$, wherein $R^1$ is deuterium or —$C_1$-$C_{10}$ alkyl-O—$C_1$-$C_{10}$ alkyl.

4. The article of claim 1, wherein the alkyl silane is selected from the group consisting of (chloroundecyl) (triethoxy) silane, (chloroundecyl) (trimethoxy) silane, (chlorohexyl) (triethoxy) silane, (chlorohexyl) (trimethoxy) silane, (chloroheptyl) (trimethoxy) silane, (chloroheptyl) (triethoxy) silane, (chlorooctyl) (trimethoxy) silane, (chlorooctyl) (triethoxy) silane, (chlorononyl) (trimethoxy) silane, and (chlorononyl) (triethoxy) silane.

5. The article of claim 1, wherein the alkyl silane is 11-chloroundecyltriethoxysilane.

6. The article of claim 1, wherein the crosslinking silane is a BIS silane of the formula (II) or a TRIS silane of the formula (III).

7. The article of claim 1, wherein the invisible-fingerprint coating has a thickness in a range of about 0.1 nm to about 1000 nm.

8. The article of claim 1, wherein the invisible-fingerprint coating has a coefficient of friction less than about 0.15.

9. The article of claim 1, wherein the invisible-fingerprint coating is able to maintain a water contact angle of at least 50 degrees after 1500 cycles of eraser abrasion.

10. The article of claim 1, non-fluorinated alkyl silane hydrolysate polymer has a weight average molecular weight of greater than or equal to 300 Da.

11. The article of claim 1, wherein the substrate is glass.

12. The article of claim 5, wherein the invisible-fingerprint coating is able to maintain a water contact angle of at least 50 degrees after 1500 cycles of eraser abrasion.

13. The article of claim 1, wherein each hydrogen atom of $R^4$ is independently optionally replaced by deuterium, halogen, —OH, —CN, —$OR^1$, —$CO_2H$, —C(O) $OR^1$, —C(O) $NH_2$, —C(O)NH($C_1$-$C_6$ alkyl), —C(O) N($C_1$-$C_6$ alkyl)$_2$, $SC_1$-$C_6$ alkyl, S(O)$C_1$-$C_6$ alkyl, —$S(O)_2C_1$-$C_6$ alkyl, —S(O)NH($C_1$-$C_6$ alkyl), —$S(O)_2$NH($C_1$-$C_6$ alkyl), S(O)N($C_1C_6$ alkyl)$_2$, —$S(O)_2$N($C_1$-$C_6$ alkyl)$_2$, —$NH_2$, NH($C_1$-$C_6$ alkyl), —N(H)$C_1$-$C_6$ alkyl-$NH_2$, —N(H)$C_1$-$C_6$ alkyl-Si(—$OC_1$-$C_6$ alkyl)$_3$, —N($R^1$)$C_1$-$C_6$ alkyl-N($R^1$)$C_1$-$C_6$ alkyl-Si(—$OC_1$-$C_6$ alkyl)$_3$-N(H)$C_1$-$C_6$ alkyl-N(H)$C_1$-$C_6$ alkyl-$NH_2$, —P($C_1$-$C_6$ alkyl)$_2$, —P(O)($C_1$-$C_6$ alkyl)$_2$, —$PO_3H_2$, or —Si(—$OC_1$-$C_6$ alkyl)$_3$; and
   each $R^1$ is independently deuterium, $C_1$-$C_{10}$ alkyl, $C_1$-$C_{10}$ alkylaryl, $C_2$-$C_{10}$ alkenyl, $C_2$-$C_{10}$ alkynyl, $C_3$-$C_6$ cycloalkyl, $C_3$-$C_6$ cycloalkylaryl, $C_1$-$C_{10}$ alkyl-O—$C_1$-$C_{10}$ alkyl, or $C_1$-$C_{10}$ alkylaryl-O—$C_1$-$C_{10}$ alkylaryl; wherein each $C_1$-$C_{10}$ alkyl or $C_1$-$C_{10}$ alkylaryl is optionally substituted with hydroxyl.

14. An article, comprising:
    a substrate comprising a glass, a glass ceramic, wood, a metal, a metal oxide, or a polymer; and
    an invisible-fingerprint coating deposited on the substrate, the invisible-fingerprint coating comprising an alkyl silane hydrolysate polymer having a weight average molecular weight of less than 100,000 Da;

wherein the alkyl silane hydrolysate polymer is formed from:

(i) an alkyl silane having a structure: $(R^A)_3SiR^B$ wherein:

each $R^A$ is independently —$OC_1$-$C_{10}$ alkyl, —$OC_6$-$C_{10}$ alkylaryl, —$OC_2$-$C_{10}$ alkenyl, or —$OC_3$-$C_{10}$ alkynyl; and $R^B$ is $C_6$-$C_{20}$ alkyl; and (ii) a crosslinking silane; and wherein the alkyl silane hydrolysate polymer comprises a halogen-substituted alkyl, with the proviso that the halogen of the halogen-substituted alkyl is chlorine, bromine, or iodine.

* * * * *